United States Patent
Lescouet et al.

(10) Patent No.: US 8,612,992 B2
(45) Date of Patent: Dec. 17, 2013

(54) OPERATING SYSTEMS

(75) Inventors: Eric Lescouet, Paris (FR); Vladimin Grouzdev, Saint-Germain-en-Laye (FR)

(73) Assignee: Jaluna SA, Montigny-le-Bretonneux (FR)

( * ) Notice: Subject to any disclaimer, the term of this patent is extended or adjusted under 35 U.S.C. 154(b) by 1703 days.

(21) Appl. No.: 10/573,918

(22) PCT Filed: Oct. 1, 2004

(86) PCT No.: PCT/IB2004/003344
§ 371 (c)(1),
(2), (4) Date: Nov. 17, 2006

(87) PCT Pub. No.: WO2005/033928
PCT Pub. Date: Apr. 14, 2005

(65) Prior Publication Data
US 2007/0074223 A1  Mar. 29, 2007

Related U.S. Application Data

(63) Continuation-in-part of application No. 10/665,352, filed on Sep. 22, 2003, now Pat. No. 7,434,224.

(30) Foreign Application Priority Data

Apr. 9, 2003 (EP) .................................. 03290894
Oct. 1, 2003 (EP) .................................. 03292428

(51) Int. Cl.
*G06F 9/46* (2006.01)
*G06F 9/455* (2006.01)
*G06F 13/24* (2006.01)

(52) U.S. Cl.
USPC ............... 718/108; 718/1; 718/104; 710/266; 710/269

(58) Field of Classification Search
None
See application file for complete search history.

(56) References Cited

U.S. PATENT DOCUMENTS

| 4,747,040 A | * | 5/1988 | Blanset et al. ................. 718/108 |
| 4,764,864 A | | 8/1988 | Takane |
| 5,144,692 A | | 9/1992 | Baker et al. |
| 5,355,490 A | * | 10/1994 | Kou ................................ 713/100 |

(Continued)

FOREIGN PATENT DOCUMENTS

| EP | 0 360 135 A1 | 3/1990 |
| EP | 1 054 322 | 11/2000 |

(Continued)

OTHER PUBLICATIONS

Office Action mailed Jun. 24, 2010 in U.S. Appl. No. 10/552,608.

(Continued)

*Primary Examiner* — Abdullah Al Kawsar
(74) *Attorney, Agent, or Firm* — Nixon & Vanderhye PC

(57) ABSTRACT

A method of enabling multiple different operating systems to run concurrently on the same RISC computer, comprising selecting a first operating system to have a relatively high priority (the realtime operating system, such as C5); selecting at least one secondary operating system to have a relatively lower priority (the general purpose operating system, such as Linux); providing a common program (a hardware resource dispatcher similar to a nanokernel) arranged to switch between said operating systems under predetermined conditions; and providing modifications to said first and second operating systems to allow them to be controlled by said common program.

31 Claims, 10 Drawing Sheets

(56) References Cited

U.S. PATENT DOCUMENTS

| | | | |
|---|---|---|---|
| 5,499,379 | A | 3/1996 | Tanaka et al. |
| 5,530,858 | A | 6/1996 | Stanley et al. |
| 5,596,755 | A * | 1/1997 | Pletcher et al. ............... 710/261 |
| 5,721,922 | A | 2/1998 | Dingwall |
| 5,740,438 | A | 4/1998 | Ratcliff et al. |
| 5,812,823 | A | 9/1998 | Kahle et al. |
| 5,884,077 | A * | 3/1999 | Suzuki .......................... 718/105 |
| 5,903,752 | A | 5/1999 | Dingwall et al. |
| 5,995,745 | A | 11/1999 | Yodaiken |
| 6,134,653 | A | 10/2000 | Roy et al. |
| 6,199,096 | B1 | 3/2001 | Mirashrafi et al. |
| 6,269,409 | B1 | 7/2001 | Solomon |
| 6,496,847 | B1 | 12/2002 | Bugnion et al. |
| 6,530,078 | B1 * | 3/2003 | Shmid et al. ................. 717/138 |
| 6,535,929 | B1 | 3/2003 | Provino et al. |
| 6,606,742 | B1 | 8/2003 | Orton et al. |
| 6,615,303 | B1 * | 9/2003 | Endo et al. .................... 710/260 |
| 6,684,261 | B1 | 1/2004 | Orton et al. |
| 6,715,016 | B1 * | 3/2004 | Ohno et al. ................... 710/260 |
| 6,725,289 | B1 | 4/2004 | Waldspurger et al. |
| 6,763,327 | B1 | 7/2004 | Songer et al. |
| 6,782,424 | B2 | 8/2004 | Yodaiken |
| 6,789,156 | B1 | 9/2004 | Waldspurger |
| 6,868,507 | B1 | 3/2005 | Gurumoorthy et al. |
| 6,920,633 | B1 | 7/2005 | Venkatraman et al. |
| 7,036,106 | B1 | 4/2006 | Wang et al. |
| 7,062,766 | B2 | 6/2006 | Ronkka et al. |
| 7,191,440 | B2 | 3/2007 | Cota-Robles et al. |
| 7,275,246 | B1 * | 9/2007 | Yates et al. ................... 718/100 |
| 7,356,677 | B1 | 4/2008 | Rafizadeh |
| 7,434,224 | B2 | 10/2008 | Lescouet et al. |
| 7,450,564 | B2 | 11/2008 | Han |
| 2001/0016879 | A1 | 8/2001 | Sekiguchi et al. |
| 2002/0078339 | A1 | 6/2002 | Hung-Ju et al. |
| 2002/0099484 | A1 | 7/2002 | Kuragaki et al. |
| 2002/0161961 | A1 | 10/2002 | Hardin et al. |
| 2003/0036843 | A1 | 2/2003 | Okude et al. |
| 2003/0037089 | A1 * | 2/2003 | Cota-Robles et al. ............ 709/1 |
| 2003/0204780 | A1 | 10/2003 | Dawkins et al. |
| 2004/0083308 | A1 | 4/2004 | Sebastian et al. |
| 2004/0177193 | A1 | 9/2004 | Ohno et al. |
| 2007/0022421 | A1 | 1/2007 | Lescouet et al. |
| 2007/0033260 | A1 | 2/2007 | Grouzdev et al. |
| 2007/0078891 | A1 | 4/2007 | Lescouet et al. |
| 2007/0300046 | A1 * | 12/2007 | Alfano et al. ................... 712/38 |
| 2008/0071991 | A1 * | 3/2008 | Shaw et al. ................... 711/132 |

FOREIGN PATENT DOCUMENTS

| | | |
|---|---|---|
| EP | 1054332 A1 | 11/2000 |
| EP | 1059582 A2 | 12/2000 |
| EP | 1 162 536 A | 12/2001 |

OTHER PUBLICATIONS

Office Action mailed Sep. 13, 2010 in U.S. Appl. No. 10/573,881.
Office Action dated Oct. 12, 2007 in U.S. Appl. No. 10/665,352 (USP 7,434,224).
Office Action dated Apr. 26, 2007 in U.S. Appl. No. 10/665,352 (USP 7,434,224).
Office Action mailed Jun. 23, 2010 in U.S. Appl. No. 10/566,274.
Office Action mailed Oct. 27, 2009 in U.S. Appl. No. 10/566,274.
Office Action mailed Feb. 26, 2009 in U.S. Appl. No. 10/566,274.
Office Action mailed Jun. 26, 2008 in U.S. Appl. No. 10/566,274.
International Search Report for PCT/IB2004/003334 mailed Aug. 2, 2006.
Abrossimov, et al., "Fast Error Recovery in CHORUS/OS: The Hot-Restart Technology," pp. 1-14 (Aug. 30, 1996).
Yaghmour, K., "Adaptive Domain Environment for Operating Systems," described in a White Paper at http://opersys.com/ftp/pub/adeos/adeos.pdf/, 7 pages.
Armand, F., "ChorusOS 5.0 Features and Architecture Overview," Sun Technical Report, No. 806-6897-10, Sun Microsystems, Palo Alto, CA, USA, pp. 1-223 (Dec. 2001).
International Search Report dated Mar. 17, 2005 in PCT/EP2004/003731.
"Jaluna-2 Preview Release 1 Description" Jaluna Product Documentation, Dec. 2002, pp. 1-32, XP0001189063.
European Search Report dated Nov. 4, 2004 in EP 03 29 0894.
Tanenbaum, Andrew S., Computer Networks, 4$^{th}$ Ed., Prentice Hall, Aug. 2002, 6 pages.
International Search Report for PCT/EP2004/006606 mailed Dec. 2, 2004.

* cited by examiner

OPERATING SYSTEMS

RELATED APPLICATIONS

This application is the US national phase of international application PCT/IB20041003344, filed 1 Oct. 2004, which designated the U.S. and claims priority of EP 03292428.4, filed 1 Oct. 2003 (now abandoned). PCT/IB2004/00334 is related by way of a continuation-in-part application to U.S. Ser. No. 10/665,352, filed 22 Sep. 2003 (now issued U.S. Pat. No. 7,434,224). The entire contents of each of the listed applications are hereby incorporated by reference.

TECHNICAL FIELD

This invention relates to operating systems. More particularly, this invention relates to systems, methods and computer programs for running multiple operating systems concurrently.

BACKGROUND

For some computer programs, it is critical that steps in the program are performed within defined time periods, or at defined times. Examples of such programs are control programs for operating mobile telephones, or for operating private branch exchanges (PBXs) or cellular base stations. Typically, the program must respond to external events or changes of state in a consistent way, at or within a certain time after the event. This is referred to as operating in "real time".

For many other programs, however, the time taken to execute the program is not critical. This applies to most common computer programs, including spreadsheet program, word processing programs, payroll packages, and general reporting or analysis programs. On the other hand, whilst the exact time taken by such programs is not critical, in most cases, users would prefer quicker execution where this is possible.

Applications programs interact with the computers on which they run through operating systems. By using the applications programming interface (API) of the operating system, the applications program can be written in a portable fashion, so that it can execute on different computers with different hardware resources. Additionally, common operating systems such as Linux or Windows provide multi-tasking; in other words, they allow several program to operate concurrently. To do so, they provide scheduling; in other words, they share the usage of the resources of the computer between the different programs, allocating time to each in accordance with a, scheduling algorithm. Operating systems of the this kind are very widely used, but they generally make no provision for running real time applications, and they therefore are unsuitable for many control or communications tasks.

For such tasks, therefore, real time operating systems have been developed; one example is ChorusOS (also known as Chorus) and its derivatives. Chorus is available as open source software.

It is described in "ChorusOS Features and Architecture overview," Francois Armand, Sun Technical Report, August 2001, 222p.

These operating systems could also be used to run other types of programs However, users understandably wish to be able to run the vast number of "legacy" programs which are written for general purpose operating systems such as Windows or Linux, without having to rewrite them to run on a real time operating system.

It would be possible to provide a "dual boot" system, allowing the user to run either one operating system or the other, but there are many cases where it would be desirable to be able to run a "legacy" program at the same time as running a real time program. For example, telecommunications network infrastructure equipment, third generation mobile phones and other advanced phones, and advanced electronic gaming equipment may require both realtime applications (e.g. game playing graphics) and non-realtime applications (game download).

In U.S. Pat. No. 5,903,752 and U.S. Pat. No. 5,721,922, an attempt is made to incorporate a real time environment into a non real time operating system by providing a real time multitasking kernel in the interrupt handling environment of the non real time operating system (such as Windows).

One approach which has been widely used is "emulation". Typically, an emulator program is written, to run under the real time operating system, which interprets each instruction of a program written for a general purpose operating system, and performs a corresponding series of instructions under the real time operating system. However, since one instruction is always replaced by many, emulation places a heavier load on the computer, and results in slower performance. Similar problems arise from the approach based on providing a virtual machine (e.g. a Java™ virtual machine). Examples of virtual machine implementations are EP 1059582, U.S. Pat. No. 5,499,379, and U.S. Pat. No. 4,764,864.

A further similar technique is described in U.S. Pat. No. 5,995,745 (Yodaiken). Yodaiken describes a system in which a multi tasking real time operating system runs a general purpose operating system as one of its tasks, pre-empting it as necessary to perform real time tasks.

Another approach is to run the realtime operating system as a module of the general purpose operating system, as described in for example EP 0360135 and the article "Merging real-time processing and UNIX V", (Gosch), ELECTRONICS, September 1990 p62. In this case, hardware interrupts are selectively masked with the intention that those concerned with the general purpose operating system should not pre-empt the realtime operating system.

Another approach is that of ADEOS (Adaptive Domain Environment for Operating Systems), described in a White Paper.

ADEOS provides a nanokernel which is intended, amongst other things, for running multiple operating systems although it appears only to have been implemented with Linux. One proposed use of ADEOS was to allow ADEOS to distribute interrupts to RTAI (Realtime Application Interface for Linux).

EP 1054332 describes a system in which a "switching unit" (which is not described in sufficient detail for full understanding) runs a realtime and a general purpose operating system. Hardware interrupts are handled by a common interrupt handler, and in some embodiments, they are handled by the realtime operating system, which then generates software interrupts at a lower priority level which are handled by routines in the secondary operating system.

BRIEF SUMMARY

An object of the present invention is to provide an improved system, method and computer program for running multiple operating systems simultaneously, even when the systems are designed for different purposes. In particular, the present invention aims to allow one of the operating systems (for example, a real time operating system) to perform without disturbance, and the other (for example, a general purpose operating system) to perform as well as possible using the remaining resources of the computer.

Accordingly, in one aspect, the present invention provides a system in which multiple operating systems are slightly modified and provided with a common program which schedules between them, in which one of the operating systems (the "primary" or "critical" operating system) is favoured over another (the "secondary" or non-critical operating system). Preferably, the invention allocates hardware preferentially to the critical operating system, and it denies the secondary operating system or systems access which would interfere with that of the critical operating system. Preferably, the present invention uses the critical operating system drivers to access shared resources, even if the access is requested by the secondary operating system. However, in no sense is the critical operating system "running" the secondary operating system, as in U.S. Pat. No. 5,995,745; each system ignores the others running alongside it and only communicates with the common program (corresponding to a nanokernel of the prior art) which brokers the access to the drivers of the critical operating system.

Preferably, the secondary operating systems are modified so that they cannot mask interrupts, and their interrupt service routines are modified to make them responsive to messages indicating that an interrupt occurred. The common program handles all hardware exceptions by passing them to the interrupt service routines of the primary operating system, and where a hardware interrupt was intended for one of the secondary operating systems, an interrupt message or notification is generated. Next time that secondary operating system is scheduled by the common program, the message or notification is passed to it, and the common program calls its interrupt service routine to service the interrupt.

Thus, the secondary operating systems cannot pre-empt the primary operating system (or, in general, a higher importance secondary operating system) in any way on occurrence of an interrupt, since all are initially handled by the primary operating system and only notified to the secondary operating system for which they are destined after the primary operating system has finished execution and that secondary operating system is scheduled.

Handling of such interrupts is thus deferred until no critical task in the primary operating system is occurring. When they are eventually actioned, however, the routines of the secondary operating system may operate in substantially unmodified fashion so that the behaviour is (except for the delay) as expected by the secondary operating system.

Other aspects, embodiments and preferred features, with corresponding advantages, will be apparent from the following description, claims and drawings.

BRIEF DESCRIPTION OF THE DRAWINGS

Embodiments of the invention will now be described, by way of example only, with reference to the accompanying drawings, in which.

DETAILED DESCRIPTION OF EXEMPLARY EMBODIMENTS

System Hardware

Figure 1:
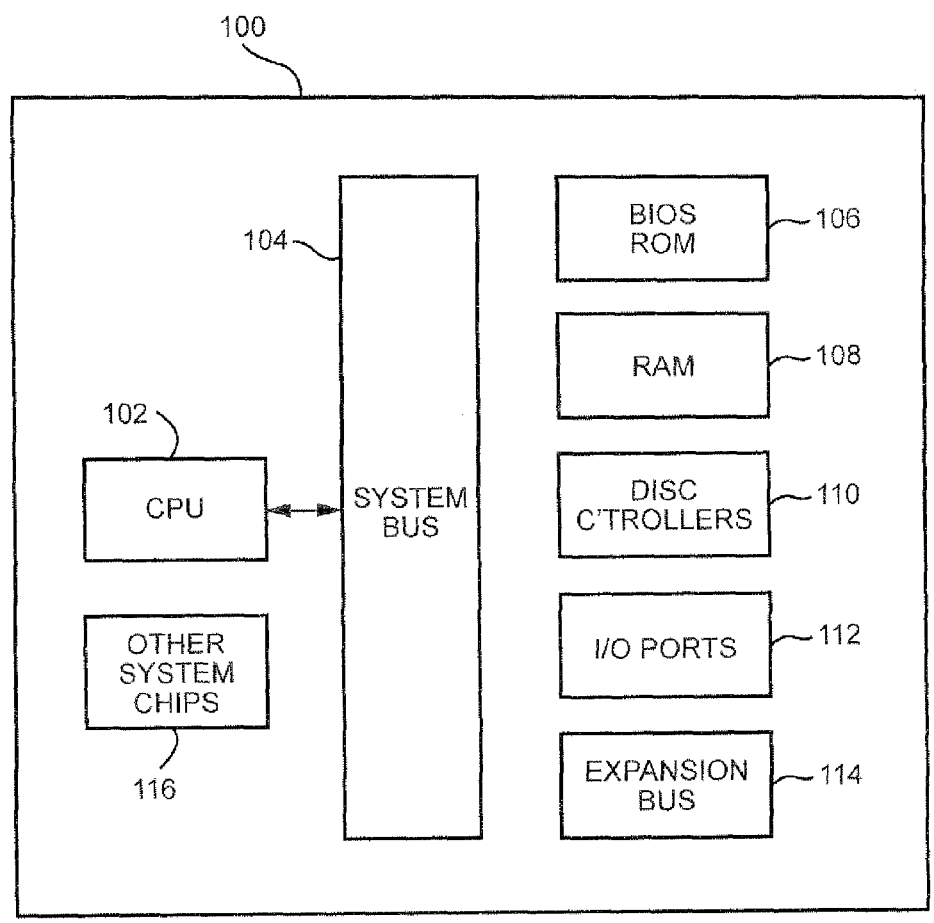
FIG. 1 is a block diagram showing the elements of a computer system on which the present invention can execute.

A computer system to which the system is applicable 100 comprises a central processing unit (CPU) 102, such as a Pentium 4™ CPU available from Intel Corporation, or PowerPC CPU available from Motorola (the embodiment has been implemented on both), coupled via a system bus 104 (comprising control, data and address buses) to a read-only memory (ROM) chip 106; one or more banks of random access memory (RAM) chips (108); disk controller devices 110 (for example, Integrated Device Electronics (IDE) or Small Computer System Interface (SCSI) controllers, connected to a floppy disk drive, a hard disk drive, and additional removable media drives such as Digital Versatile Disc (DVD) drives); one or more input/output ports (112) (for example, one or more Universal Serial Bus (USB) port controllers, and/or parallel port controllers for connection to printer and so on); an expansion bus 114 for bus connection to external or internal peripheral devices (for example, the Peripheral Component Interconnect (PCI) bus); and other system chips 116 (for example, graphics and sound devices). Examples of computers of this type are personal computers (PCs) and workstations. However, the application of the invention to other computing devices such as mainframes, embedded microcomputers in control systems, and Personal Digital Assistants (PDAs) (in which case some of the indicated devices such as disk drive controllers may be absent) is also disclosed herein.

Management of Software

Figure 2A:
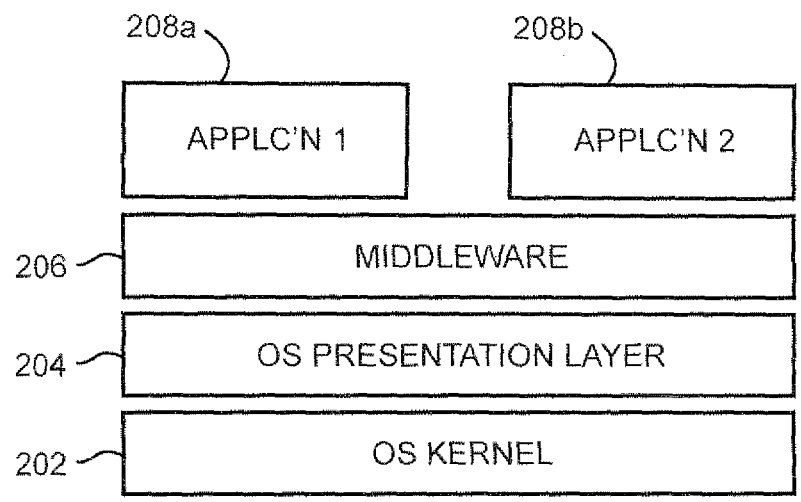
FIG. 2*a* is a diagram illustrating the arrangement of software in the prior art.

Referring to FIG. 2*a*, in use, the computer 100 of FIG. 1 runs resident programs comprising operating system kernel 202 (which provides the output routines allowing access by the CPU to the other devices shown in FIG. 1); an operating system user interface or presentation layer 204 (such as X Windows); a middleware layer 206 (providing networking software and protocols such as, for instance, a Transmission Control Protocol/Internet Protocol (TCP/IP) stack) and applications 208*a*, 208*b*, which run by making calls to the Application Programming Interface (API) routines forming the operating system kernel 202.

The operating system kernel has a number of tasks, in particular:

scheduling (i.e., sharing the CPU and associated resources between different applications which are running);

memory management (i.e. allocating memory to each task, and, where necessary, swapping data and programs out of memory add on to disc drives);

providing a file system;

providing access to devices (typically, through drivers);

interrupt handling;

providing an applications programming interface enabling the applications to interact with system resources and users.

The kernel may be a so-called "monolithic kernel" as for Unix, in which case the device drivers form part of the kernel itself. Alternatively, it may be a "microkernel" as for Chorus, in which case the device drivers are separate of the kernel.

In use, then, when the computer 100 is started, a bootstrap program stored in ROM 106 accesses the disk controllers 110 to read the file handling part of the operating system from permanent storage on disk into RAM 108, then loads the remainder of the operating system into an area of RAM 108. The operating system then reads any applications from the disk drives via the disk controllers 110, allocates space in RAM 108 for each, and stores each application in its allocated memory space.

During operation of the applications, the scheduler part of the operating system divides the use of the CPU between the different applications, allowing each a share of the time on the processor according to a scheduling policy. It also manages use of the memory resources, by "swapping out" infrequently used applications or data (i.e. removing them from RAM 108 to free up space, and storing them on disk).

Finally the routines making up the applications programming interface (API) are called from the applications, to execute functions such as input and output, and the interrupt handling routines of the operating system respond to interrupt and events.

Summary of Principles of the Preferred Embodiment

In the preferred embodiment, each operating system 201, 202 to be used on the computer 100 is slightly re-written, and a new low-level program 400 (termed here the "hardware resource dispatcher", and sometimes known as a "nanokernel" although it is not the kernel of an operating system) is created. The hardware resource dispatcher 400 is specific to the particular type of CPU 102, since it interacts with the processor. The versions of the operating systems which are modified 201, 202 are also those which are specific to the hardware, for reasons which will become apparent.

The hardware resource dispatcher 400 is not itself an operating system. It does not interact with the applications programs at all, and has very limited functionality. Nor is it a virtual machine or emulator; it requires the operating systems to be modified in order to cooperate, even though it leaves most of the processing to the operating systems themselves, running their native code on the processor. It performs the following basic functions:

loading and starting each of the multiple operating systems;

allocating memory and other system resources to each of the operating systems;

scheduling the operation of the different operating systems (i.e. dividing CPU time between them, and managing the change over between them);

providing a "virtualised device" method of indirect access to those system devices which need to be shared by the operating systems ("virtualising" the devices);

providing a communications link between the operating systems, to allow applications running on different operating systems to communicate with each other.

The operating systems are not treated equally by the embodiment. Instead, one of the operating systems is selected as the "critical" operating system (this will be the real time operating system), and the or each other operating system is treated as a "non-critical" or "secondary" operating system this will be the or each general purpose operating system such as Linux).

When the hardware resource dispatcher is designed, it is provided with a data structure (e.g. a table) listing the available system resources (i.e. devices and memory), to enable as many system devices as possible to be statically allocated exclusively to one or other of the operating systems.

For example, a parallel printer port might be statically allocated to the general purpose operating system 202, which will often run applications which will need to produce printer output. On the other hand, an Integrated Services Digital Network (ISDN) digital line adapter port may be permanently allocated to the real time operating system 201 for communications. This static allocation of devices wherever possible means that each operating system can use its existing drivers to access statically allocated devices without needing to call the hardware resource dispatcher. Thus, there is no loss in execution speed in accessing such devices (as there would be if it acted as a virtual machine or emulator).

In the case of system devices which must be shared, the hardware resource dispatcher virtualises uses of the devices by the non-critical operating systems, and makes use of the drivers supplied with the critical operating system to perform the access. Likewise, for interrupt handling, the interrupts pass to the critical operating system interrupt handling routines, which either deal with the interrupt (if it was intended for the critical operating system) or pass it back through the hardware resource dispatcher for forwarding to a non critical operating system (if that was where it was destined).

On boot, the hardware resource dispatcher is first loaded, and it then loads each of the operating systems in a predetermined sequence, starting with the critical operating system, then following with the or each secondary operating system in turn. The critical operating system is allocated the resources it requires from the table, and has a fixed memory space to operate in. Then each secondary operating system in turn is allocated the resources and memory space it requires from the available remaining resources.

Thus, according to the embodiment, the resources used by the operating systems are separated as much as physically possible, by allocating each its own memory space, and by providing a static allocation of devices exclusively to the operating systems; only devices for which sharing is essential are shared.

In operation, the hardware resource dispatcher scheduler allows the critical operating system to operate until it has concluded its tasks, and then passes control back to each non critical operating system in turn, until the next interrupt or event occurs.

The embodiment thus allows a multi operating system environment in which the operation of the critical operating system is virtually unchanged (since it uses its original drivers, and has first access to any interrupt and event handling). The secondary operating systems are able to operate efficiently, within the remaining processor time, since in most cases they will be using their own native drivers, and will have exclusive access to many of the system devices. Finally, the hardware resource dispatcher itself can be a small program, since it handles only limited functions, so that system resources are conserved.

The preferred embodiment is also economic to create and maintain, because it involves only limited changes to standard commercial operating systems which will already have been adapted to the particular computer 100. Further, since the changes to the operating systems are confined to architecture specific files handling matters such as interrupt handling, and configuration at initialising time, which interface with the particular type of computer 100, and which are unlikely to change as frequently as the rest of the operating system, there may be little or no work to do in adapting new Versions Of The Same Operating System To Work In A Multiple Operating System Fashion.

Detailed Description of the Preferred Embodiment

In this embodiment, the computer 100 was an Intel 386 family processor (e.g. a Pentium processor) and a Motorola PowerPC 750 (Reduced Instruction Set Computer or "RISC") computer (step 302). The critical operating system 201 was the C5 operating system (the real time microkernel of Jaluna-1, an open-source version of the fifth generation of the ChorusOS system, available for open source.

In step 306, the ChorusOS operating system kernel 201 is modified for operating in multiple operating system mode, which is treated in the same way by porting to a new platform (i.e. writing a new Board Support Package to allow execution on a new computer with the same CPU but different system devices). The booting and initialisation sequences are modified to allow the real time operating system to be started by the hardware resource dispatcher, in its allocated memory space, rather than starting itself. The hardware-probing stage of the initialisation sequence is modified, to prevent the critical operating system from accessing the hardware resources which are assigned to other secondary systems. It reads the static hardware allocation table from the hardware resource dispatcher to detect the devices available to it.

Trap calls are added to the critical operating system, to detect states and request some actions in response. A trap call here means a call which causes the processor to save the current context (e.g. state of registers) and load a new context. Thus, where virtual memory addressing is used, the address pointers are changed. For example, when the real time operating system 201 reaches an end point (and ceases to require processor resources) control can be passed back to the hardware resource dispatcher, issuing the "idle" trap call, to start the secondary operating system. Many processors have a "halt" instruction. In some cases, only supervisor-level code (e.g. operating systems, not applications) can include such a "halt" instruction. In this embodiment, all the operating systems are rewritten to remove "halt" instructions and replace them with an "idle" routine (e.g. an execution thread) which, when called, issues the "idle" trap call.

Some drivers of the Board Support Package are specially adapted to assist the hardware resource dispatcher in virtualizing the shared devices for secondary operating systems.

Additional "virtual" drivers are added which, to the operating system, appear to provide access to an input/output (I/O) bus, allowing data to be written to the bus. In fact, the virtual bus driver uses memory as a communications medium; it exports some private memory (for input data) and imports memory exported by other systems (for output data). In this way, the operating system 201 (or an application running on the operating system) can pass data to another operating system (or application running on it) as if they were two operating systems running on separate machines connected by a real I/O bus.

The secondary operating system 202 was selected (step 308) as Linux, having a kernel version 2.4.18 (step 308).

In step 310, the secondary operating system kernel 202 is modified to allow it to function in a multiple operating system environment, which is treated as new hardware architecture. As in step 306, the boot and initialisation sequences are modified, to allow the secondary operating system to be started by the hardware resource dispatcher, and to prevent it from accessing the hardware resources assigned to the other systems, as specified in the hardware resource dispatcher table. As in step 306, trap calls are added, to pass control to the hardware resource dispatcher.

Native drivers for shared system devices are replaced by new drivers dealing with devices which have been virtualized by the hardware resource dispatcher (interrupt controller, I/O bus bridges, the system timer and the real time clock). These drivers execute a call to virtual device handlers 416 of the hardware resource dispatcher in order to perform some operations on a respective device of the computer 100. Each such virtual device handler 416 of the hardware resource dispatcher is paired with a "peer" driver routine in the critical operating system, which is arranged to directly interact with the system device. Thus, a call to a virtual device handler is relayed up to a peer driver in the critical system for that virtualized device, in order to make real device access. As in step 306, read and write drivers for the virtual I/O bus are provided, to allow inter-operating system communications.

The interrupt service routines of the secondary operating system are modified, to provide virtual interrupt service routines each of which responds to a respective virtual interrupt (in the form of a call issued by an interrupt handler routine 412 of the hardware resource dispatcher), and not to respond to real interrupts or events. Routines of the secondary operating system (including interrupt service routines) are also modified to remove masking of hardware interrupts (at least in all except critical operations). In that way, the secondary operating systems 202, . . . are therefore pre-emptable by the critical operating system 201; in other words, the secondary operating system response to a virtual interrupt can itself be interrupted by a real interrupt for the critical operating system 201. This typically includes: [0076] masking/unmasking events (interrupts at processor level); [0077] saving/restoring events mask status; [0078] identifying the interrupt source (interrupt controller devices); [0079] masking/unmasking interrupts at source level (interrupt controller devices).

New virtual device drivers are added, for accessing the shared hardware devices (the I/O bus bridges, the system console, the system timer and the real time clock). These drivers execute a call to virtual device handlers 416 of the hardware resource dispatcher in order to write data to, or read data from, a respective device of the computer 100.

To effect this, the Linux kernel is modified in this embodiment by adding new virtual hardware resource dispatcher architecture sub trees (nk-i386 and nk-ppc for the I-386 and PowerPC variants) with a small number of modified files. Unchanged files are reused in their existing form. The original sub-trees are retained, but not used.

Figure 4:
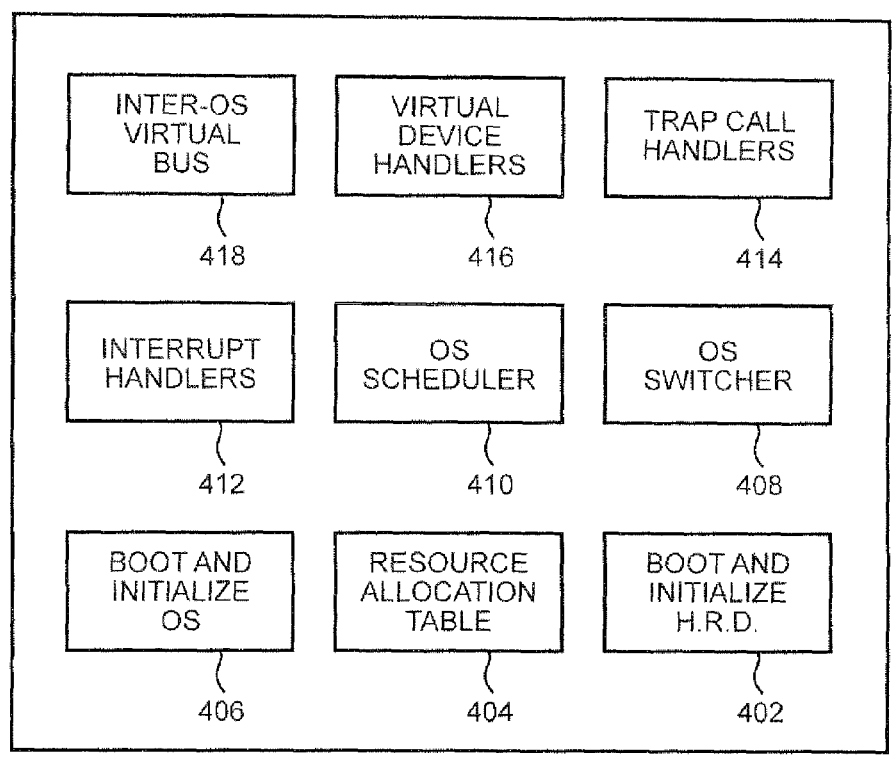
FIG. 4 shows the components of a hardware resource dispatcher forming part of FIG. 2*b*.

In step 312, the hardware resource dispatcher 400 is written. The hardware resource dispatcher comprises code which provides routines for the following functions as (as shown in FIG. 4):

booting and initialising itself (402);

storing a table which stores a list of hardware resources (devices such as ports) and an allocation entry indicating to which operating system each resource is uniquely assigned;

booting and initialising the critical operating system that completes the hardware resource dispatcher allocation tables (404);

booting and initialising secondary operating systems (406);

switching between operating systems (408);

scheduling between operating systems (410);

handling interrupts (using the real time operating system interrupt service routines, and supplying data where necessary to the virtual interrupt service routines of the secondary operating systems) (412);

handling trap calls from each of the operating systems (414);

handling access to shared devices from the secondary operating systems (416);

handling inter-operating system communications on the virtual I/O bus (418).

In further embodiments (described below), it may also provide a system debugging framework.

Operating System Switcher 408

In order to switch from an operating system to another, the operating system switcher 408 is arranged to save the "context"—the current values of the set of state variables, such as register values—of the currently executing operating system; restore the stored context of another operating system; and call that other operating system to recommence execution where it left off. Where the processor uses segments of memory, and virtual or indirect addressing techniques, the registers or data structures storing the pointers to the current memory spaces are thus swapped. For example, the operating systems each operate in different such memory spaces, defined by the context including the pointer values to those spaces.

In detail, the switcher provides:

explicit switches (e.g. trap calls) from the currently running to the next scheduled operating systems, when the current becomes idle; and implicit switches from a secondary operating system to the critical operating system, when a hardware interrupt occurs.

The switches may occur on a trap call or a real or virtual interrupt, as described below.

Scheduler 410

The scheduler 410 allocates each operating system some of the available processing time, by selecting which secondary operating system (if more than one is present) will be switched to next, after exiting another operating system. In this embodiment, each is selected based on fixed priority scheduling. Other embodiments allowing specification based on time sharing, or guaranteed minimum percentage of processor time, are also contemplated herein. In each case, however, the critical operating system is pre-empted only when in the idle state.

In further embodiments, the critical operating system may explicitly inform the scheduler 410 when it may be pre-empted, so as to allow all secondary operating systems some access to the CPU to perform tasks with higher priority then the tasks still running in critical system. Thus, in one example, the interrupt service routines of the critical operating system cannot be preempted, so that the critical operating system can always respond to external events or timing signals from the realtime clock, maintaining realtime operation.

Handling Virtualised Processor Exceptions

The hardware resource dispatcher is arranged to provide mechanisms to handle processor exceptions (e.g. CPU interrupts or co-processor interrupts) as follows:

firstly, to intercept processor exceptions through the critical operating system;

secondly, to post a corresponding virtual exception to one or more secondary operating systems; to store that data and, when the scheduler next calls that secondary operating system, to call the corresponding virtual interrupt service routine in the secondary operating system;

thirdly, to mask or unmask any pending virtual exceptions from within secondary operating systems.

Virtualised exceptions are typically used for two different purposes;

Firstly, to forward hardware device interrupts (which are delivered as asynchronous processor exceptions) to secondary operating systems;

Secondly, to implement inter-operating system cross-interrupts—i.e. interrupts generated by one system for another interrupts (which are delivered as synchronous exceptions).

Trap Call Handler 414

The operation of the trap call handler will become apparent from the following description. Its primary purpose is to allow the scheduler and switcher to change to another operating system when a first one halts (and hence does not require CPU resources). An additional role is to invoke hardware resource dispatcher services such as a system console for use in debugging as discussed in relation to later embodiments.

Virtualised Devices 416

As indicated above, for each shared device (e.g. interrupt controller, bus bridges, system timer, realtime clock) each operating system provides a device driver, forming a set of peer-level drivers for that device. The realtime operating system provides the driver used to actually access the device, and the others provide virtual device drivers.

The shared device handler 416 of the hardware resource dispatcher provides a stored data structure for each device, for access by all peer device drivers of that device. When the device is to be accessed, or has been accessed, the device drivers update the data stored in the corresponding data structure with the details of the access.

The peer drivers use cross-interrupts (as discussed above) to signal an event to notify other peer drivers that that the data structure has just been updated.

The drivers which are for accessing interrupt controller devices use the virtualised exception mechanisms discussed above to handle hardware interrupts as follows:

The critical operating system device driver handles hardware interrupts and forwards them as virtualised exceptions to the secondary peer drivers;

The secondary operating system enables and disables interrupts by using the virtualised exception masking and unmasking routines discussed above.

I/O buses and their bridges only have to be shared if the devices connected to them are not all allocated to the same operating system. Thus, in allocating devices, to the extent possible, devices connected to the same I/O bus are allocated to the same operating system. Where sharing is necessary, the resource allocation table 404 stores descriptor data indicating the allocation of the resources on the bus (address spaces, interrupt lines and I/O ports) to indicate which operating system has which resources.

Implementation of the Embodiment

Finally, in step 314, the code for the hardware resource dispatcher and operating systems is compiled as a distributable binary computer program product for supply with the computer 100.

A product which may be supplied in accordance with an aspect of the invention is a development environment product, comprising a computer program which enables the user to select different operating systems to be used, build and select different applications for each operating system, embed the application and operating systems into a deliverable product, and provide for booting of the operating system and launch of executable binaries of the applications. This is based on, and similar to, the C5 development environment, available from www.jaluna.com.

Operation of the Embodiment During Booting and Initialisation

Figure 5:
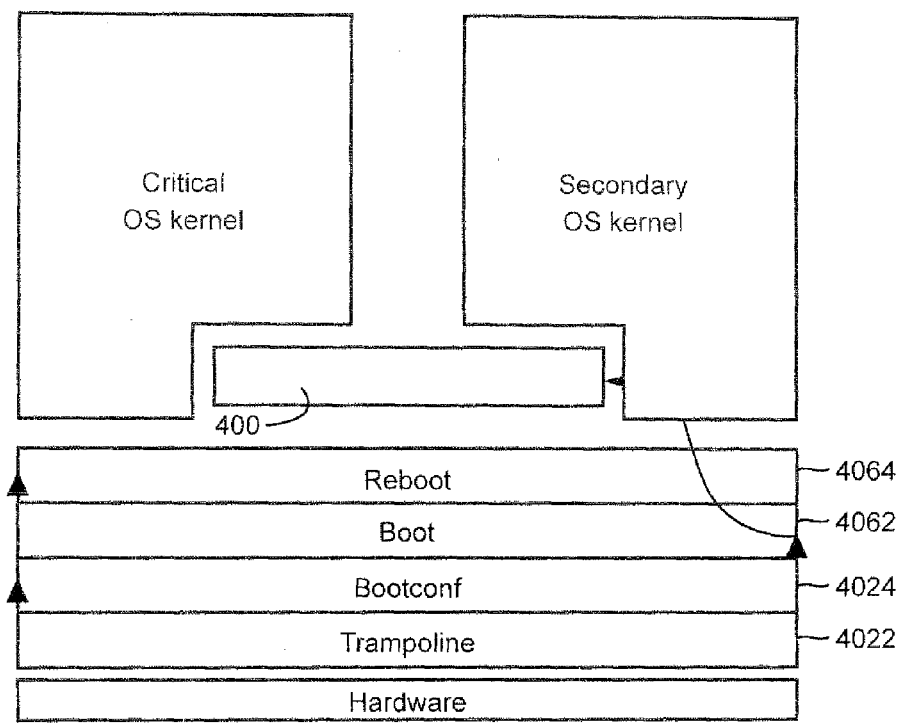
FIG. 5 illustrates the program used in a boot and initialisation sequence; process.

Referring to FIG. 5, the boot and initialisation processes according to this embodiment are performed as follows.

A bootstrapping program ("trampoline") 4022 stored in the ROM 106 is executed when power is first supplied, which starts a program 4024 which installs the rest of the hardware resource dispatcher program 400 into memory, and starts it, passing as an argument a data structure (as described below) describing the system image configuration.

The hardware resource dispatcher initialises a serial line which may be used for a system console. It then allocates memory space (an operating system environment) for each operating system in turn, starting with the critical operating system. The hardware resource dispatcher therefore acts as a second level system kernel boot loader.

Each operating system kernel then goes through its own initialisation phase, selecting the resources to be exclusive to that operating system within those remaining in the resource allocation table 404, and starting its initial services and applications.

Figure 6:
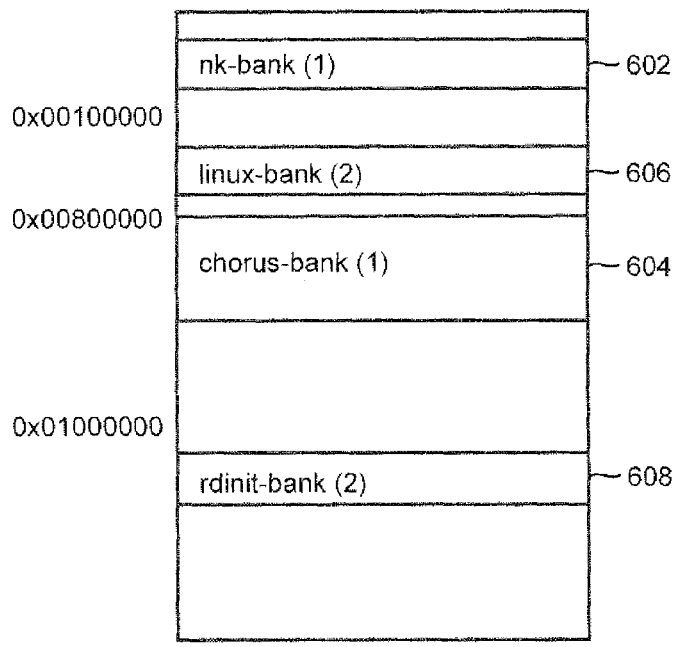

FIG. 6 illustrates an example of a memory address allocation forming the system image. A position within memory is allocated when the hardware resource dispatcher and operating systems are compiled. The set of these positions in memory defines the system image, shown in FIG. 6. The system image comprises a first bank of memory 602 where the hardware resource dispatcher is located; a second bank of memory 604 where the real time operating system is located; a third bank of memory 606 where the secondary operating system is located; and, in this embodiment, a fourth bank of memory 608 where the RAM disk containing a root file system of the secondary operating system (Linux) is located.

This system image is stored in persistent storage (e.g. read only memory for a typical real time device such as a mobile telephone or Private Branch Exchange (PBX)). The remaining banks of memory are available to be allocated to each operating system as its environment, within which it can load and run applications.

Allocation of Memory for Operating System Context

Whilst being booted, each operating system then allocates a complementary piece of memory in order to meet the total size required by its own configuration. Once allocated to an operating system, banks of memory are managed using the physical memory management scheme of the operating system itself. All other memory is ignored by the operating system.

Virtual Memory Allocation

Each operating system is allocated separate virtual memory spaces, to make sure that operating systems cannot interfere with each other or with the hardware resource dispatcher. The User address spaces (i.e. ranges) and Supervisor address space (i.e. range) of each of the operating systems is each allocated a different memory management unit (MMU) context identifier (ID), which allow the differentiation of different virtual memory spaces having overlapping addresses. The MMUs context IDs are assigned to each operating system at the time it is compiled (step 314 of FIG. 3).

This solution avoids the need to flush translation cashes (TLBs) when the hardware resource dispatcher switches between different operating systems, which would take additional time. Instead, the switch over between different operating systems is accomplished by storing the MMU context IDs of the currently function operating system, and recalling the previously stored MMU context IDs of the switched two operating system.

Allocation of Input/Output Devices

As indicated above, the allocation table 404 indicates which devices are allocated uniquely to each operating system. In addition, table 404 indicates which input/output resources (Direct Memory Access (DMA) devices, input/output ports, interrupts and so on) are allocated exclusively to such devices, thus allowing a direct use of these resources without any conflict. Typically, many devices are duplicated, so it is possible to reduce potential conflicts substantially in this way.

The distribution is based on the operating system configuration scheme (for example, in the case of C5, the devices specified in the device tree). They are allocated to operating systems at boot time, and in order of booting, so that the critical operating system has first choice of the available devices in the table 404 and the secondary operating systems in turn receive their allocation in what remains. As each operating system initialised, it detects the presence of these devices and uses its native drivers for them without interaction from the hardware resource dispatcher.

"Hot" Reboot of Secondary Operating System

According to the present embodiments, it is possible to reboot a secondary operating system (for example because of a crash) whilst other operating systems continue to run. Because of the separation of system resources, a crash in the secondary operating system does not interfere with the ongoing operation of the critical operating system (or other secondary operating systems) and the rebooting of that secondary operating system does not do so either.

In the embodiment, the system "stop" and "start" trap calls to the hardware resource dispatcher assist in shutting down and restarting the secondary operating systems from within the critical operating system. Additionally, the hardware resource dispatcher saves a copy of the original system image, at boot time, in persistent memory within the hardware resource dispatcher allocated memory. As an example, hot restart in this embodiment is managed as follows:

At the time of initially booting up, the hardware resource dispatcher saves a copy of the secondary operating systems memory image.

The critical operating system includes a software watchdog driver routine for periodically monitoring the functioning of the secondary operating systems (for example, by setting a timeout and waiting for an event triggered by a peer driver running in the secondary operating systems so as to check for their continued operation).

If the critical operating system detects that the secondary operating system has failed or stopped, it triggers "stop" and then "start" trap calls (of the secondary operating system) to the hardware resource dispatcher.

The hardware resource dispatcher then restores the saved copy of the secondary operating system image, and reboots it from memory to restart. It was found that, on tests of an embodiment, the Linux secondary operating system could be rebooted within a few seconds from locking up. In other respects, the hot restart builds upon that available in the Chorus operating system, as described for example in:

"Fast Error Recovery in CHORUS/OS. The Hot-Restart Technology," Abrossimov, F. Hermann., J. C. Hugly, et al, Chorus Systems Inc, Technical Report, August 1996, 14 p.

Run-Time Operation

The operation of the embodiment after installation and booting will now be described in greater detail.

Having been booted and initialised, the real time operating system is running one or more applications 207 (for example a UDP/IP stack—UDP/IP stands for Universal Datagram Protocol/Internet Protocol) and the secondary operating system is running several applications 208a, 208b (for example a word processor and a spreadsheet). The real time operating system microkernel 201 and the secondary operating system kernel 202 communicate with the hardware resource dispatcher through the hardware resource dispatcher interface which comprises:

- a data structure representing the operating system context (i.e. the set of state variables which need to be saved and restored in order to switch to the operating system), and the hardware repository;
- the set of functions which execute in the operating system environment; and
- the set of trap call routines which execute in the hardware resource dispatcher environment.

If neither operating system requires processor time (for example, both have reached "wait" states) then the hardware resource dispatcher 400 switches to the critical operating system's idle thread, in which it waits an interrupt or event. Thus, interrupts can be processed immediately by the critical operating system's servicing routines, without needing to switch to the critical operating system first.

At some point, an interrupt or event will occur. For example, a packet may be received at a data port, causing an interrupt to allow it to be processed by the real time operating system executing the UDP/IP stack. Alternatively, a user may manipulate a keyboard or mouse, causing an interrupt to operate the Graphical User Interface (GUI) of the second operating system 202 for interaction with the word processing application 208. Alternatively, the system clock may indicate that a predetermined time has elapsed, and that an application should commence re-execution, or an operating system function should execute.

The critical operating system servicing routine then services the interrupt, as described below.

Interrupt and Event Handling

If not already in the critical operating system, the hardware resource dispatcher interrupt handler 412 calls the operating system switcher 408 to switch to the critical operating system, and then the interrupt handler routine 412 to call an interrupt service routine (ISR) in the critical operating system 201. If the interrupt is intended for the critical operating system, either because it is from a device uniquely assigned to the critical operating system or because it is from a shared device and has a certain predetermined value, the critical operating system ISR takes the action necessary to handle the interrupt. If not, control is passed back to the hardware resource dispatcher.

Critical to Secondary Operating Systems Switch

Figure 7:
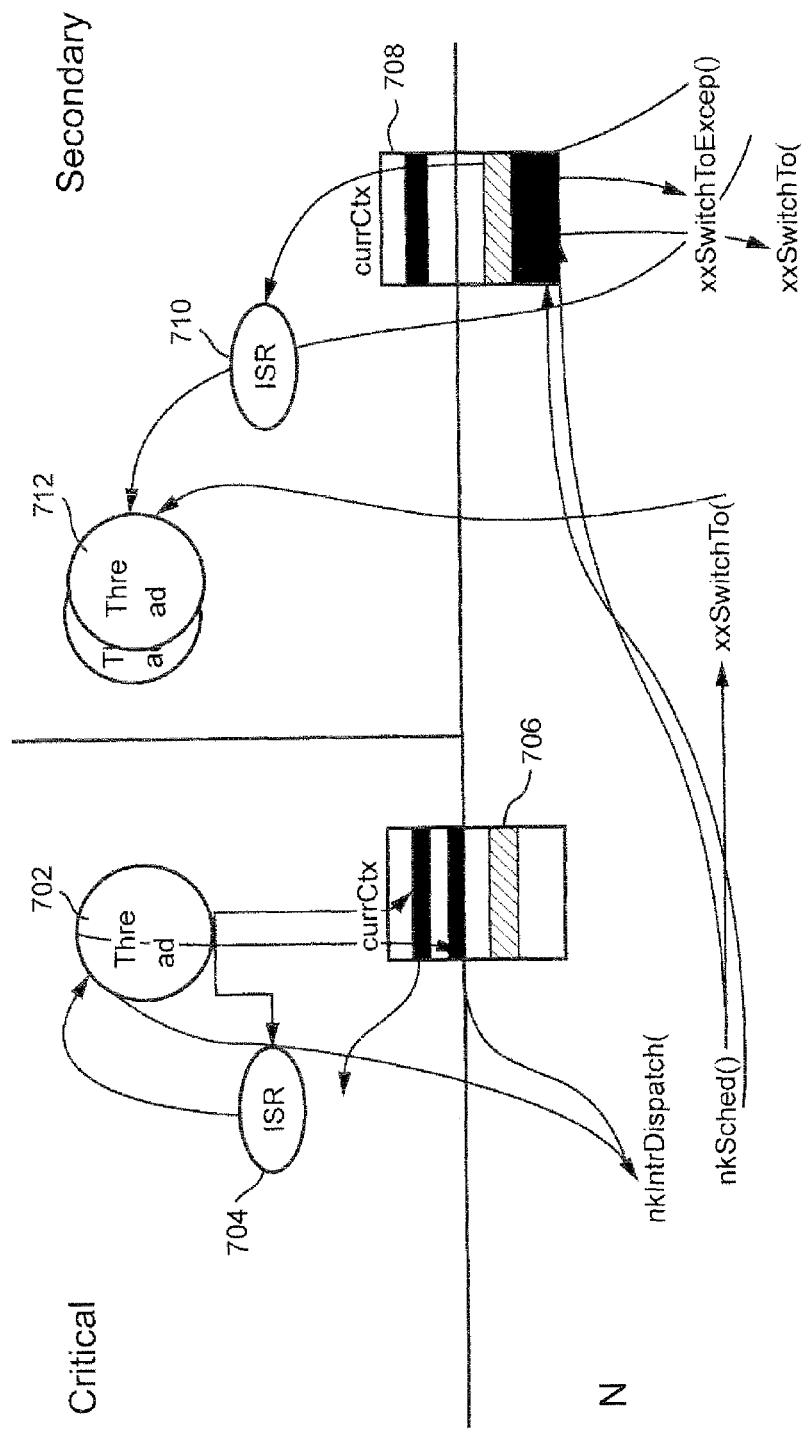
FIG. 7 illustrates the transition from a primary operating system to a secondary operating system.

Referring to FIG. 7, for this example, the system is executing a thread 702 of an application 207a running on the critical operating system 201.

If an interrupt occurs, a critical operating system interrupt service routine 704 performs interrupt servicing. On termination, control passes back to the thread 702 and any others executed by the scheduler of the critical operating system 201. When processing of all threads is complete, the critical operating system has finished executing, it schedules its "idle" thread. Accordingly the "idle" trap routine in the critical operating system issues an "idle" trap call to the hardware resource dispatcher 400. The hardware resource dispatcher then executes a routine which does the following:

- If the interrupt handler 412 currently has some stored virtual interrupts, these are forwarded by the interrupt handler 412 to the secondary operating system.
- The hardware resource dispatcher operating system scheduler 410 selects the secondary operating system 202 to execute. The OS switcher 408 then saves the current context (typically, processor MMU and status registers, instruction and stack pointers) in the critical OS context storage area 706. It then retrieves the stored execution context 708 for the secondary operating system 202, and writes them to the registers concerned.
- If there are virtual interrupts for the secondary OS concerned, the interrupt handler 412 calls the relevant interrupt service routine 710 within the secondary operating system, which services the interrupt and then, on completion, reverts to the execution of a thread 712 of the secondary operating system where it left off.
- If the interrupt handler 412 currently has no pending interrupts, then the hardware resource dispatcher operating switcher 408 causes the secondary operating system to recommence execution where it left off, using the stored program counter value within the restored operating system context, in this case at the thread 712.

Thus, after the critical operating system 201 has performed some function (either servicing its own applications or services, or servicing an interrupt intended for another operating system), the hardware resource dispatcher passes control back to the next secondary operating system 202, as determined by the scheduler 410.

Secondary to Critical Operating System Switch on interrupt

Figure 8:
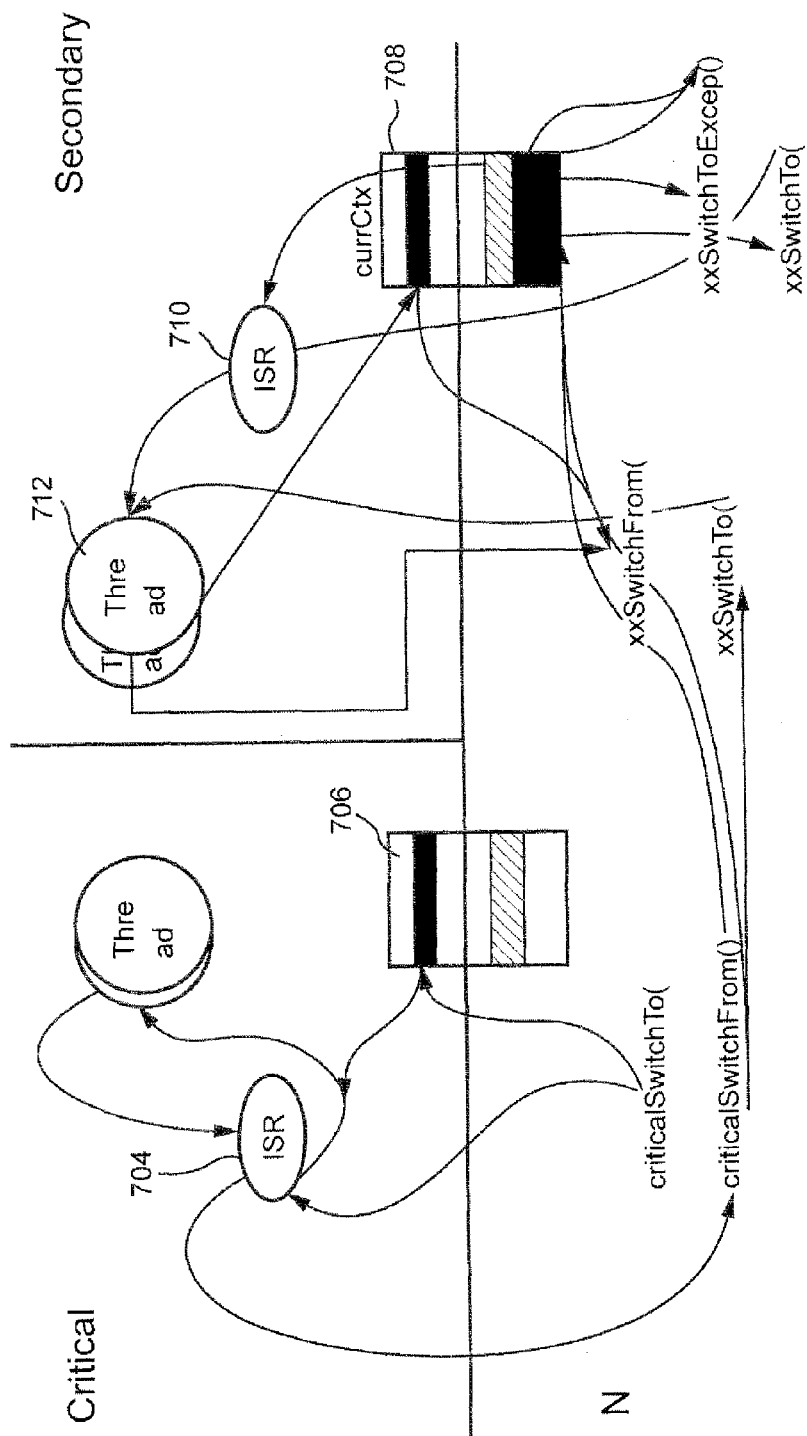
FIG. 8 illustrates the transition from a secondary operating system to a primary operating system.

Referring to FIG. 8, the process of transferring from the secondary operating system to the critical operating system will now be disclosed. In this case, the system is executing a thread 712 of an application 208a running on the critical operating system 202.

When a hardware interrupt occurs, the hardware resource dispatcher starts the OS switcher, to save the secondary operating system context in the context storage area 708. It then switches to the primary operating system 201, restoring the values of state variables from the context storage area 706, and calls the interrupt service routine 704 of the primary operating system 201. After servicing the interrupt, the scheduler of the primary operating system 201 may pass control back from the ISR 704 to any thread 704 which was previously executing (or thread to be executed).

When the ISR and all threads are processed, the primary operating system 201 passes control back to the hardware resource dispatcher, which switches from the primary operating system 201 (saving the state variables in the context storage 706) and switches to a selected secondary operating system 201 (retrieving the state variables from the context storage 708), in the manner discussed with reference to FIG. 7 above.

Inter-Operating System Communications—Virtual Bus 418

The virtual bus routine cooperates with the virtual bus drivers in each operating system. It emulates a physical bus connecting the operating systems, similar to Compact PCI (cPCI) boards plugged into a cPCI backplane. Each operating system is provided with a driver routine for the virtual bus bridge device on this virtual bus, allowing the operating systems and their applications to communicate by any desired protocol, from raw data transfer to a full IP protocol stack.

The hardware resource dispatcher virtual bus is based on shared memory and system cross interrupts principles already discussed above. In detail, the virtual bus routine 418 emulates the C5 buscom DDI: syscom which defines virtual bus bridge shared devices, allowing the export (sharing) of memory across the virtual bus and triggering of cross-interrupts into other operating systems.

Each virtual bus driver, in each secondary operating system, creates such a virtual bus bridge in the hardware resource dispatcher hardware repository at startup time. By doing so, it exports (shares) a region of its private memory, and provides a way to raise interrupts within its hosting system.

Thus, a virtual bus driver of a first operating system sends data to a second operating system by:
- writing into the memory exported by a peer virtual bus driver of the second operating system, and then;
- triggering a cross-interrupt to notify that data are available to the peer bus driver in the second operating system.

In the reverse (incoming) direction, the virtual bus driver propagates incoming data up-stream (for use by the application or routine for which it is intended) when receiving a cross-interrupt indicating that such data have been stored in its own exported memory region.

Figure 9A:
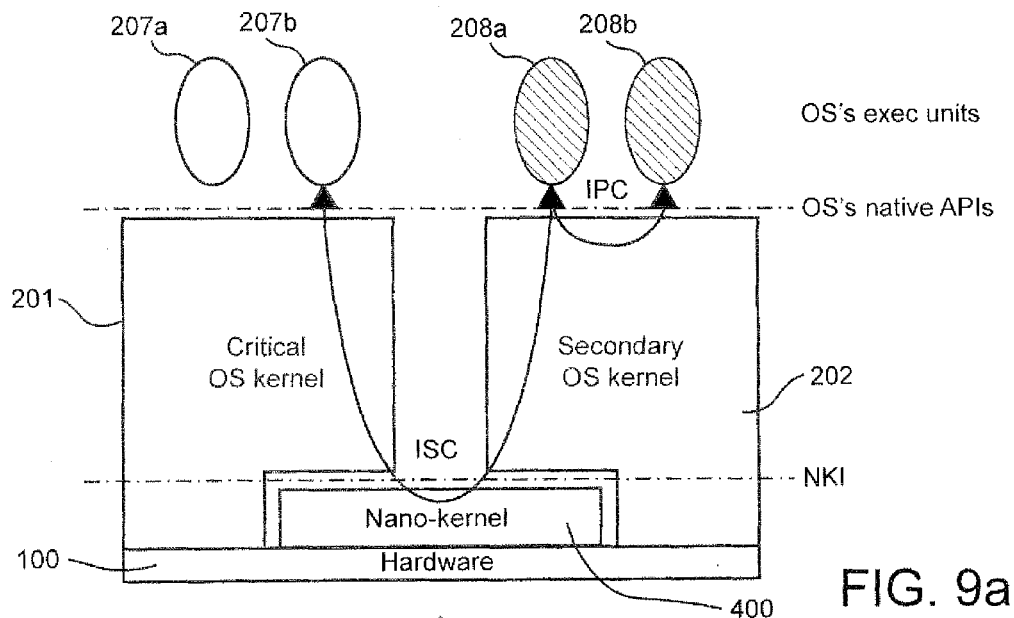
FIG. 9*a* illustrates the communication between applications running on different operating systems according to the invention.

Referring to FIG. 9a, an application 208a which is to communicate with another 208b running on the same operating system 202 can do so through that operating system. An application 207b running on one operating system 201 which is to communicate with another 208b running on a different operating system 202 does so by writing data to the virtual bus using the API of its operating system, which uses the virtual bus driver routine to pass the data to the other operating system 202, which propagates it from its virtual bus driver to the application 208b.

Figure 9B:
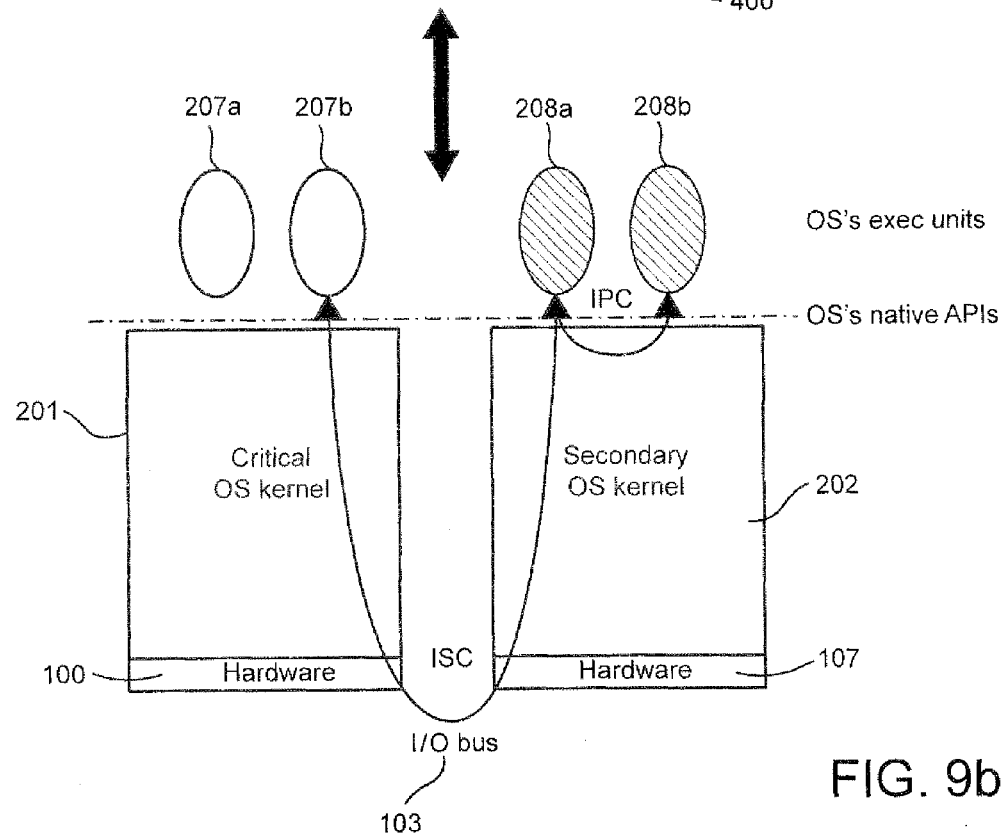
FIG. 9*b* illustrates the communication between applications running on different operating systems on different computers according to the invention.
Figure 10:
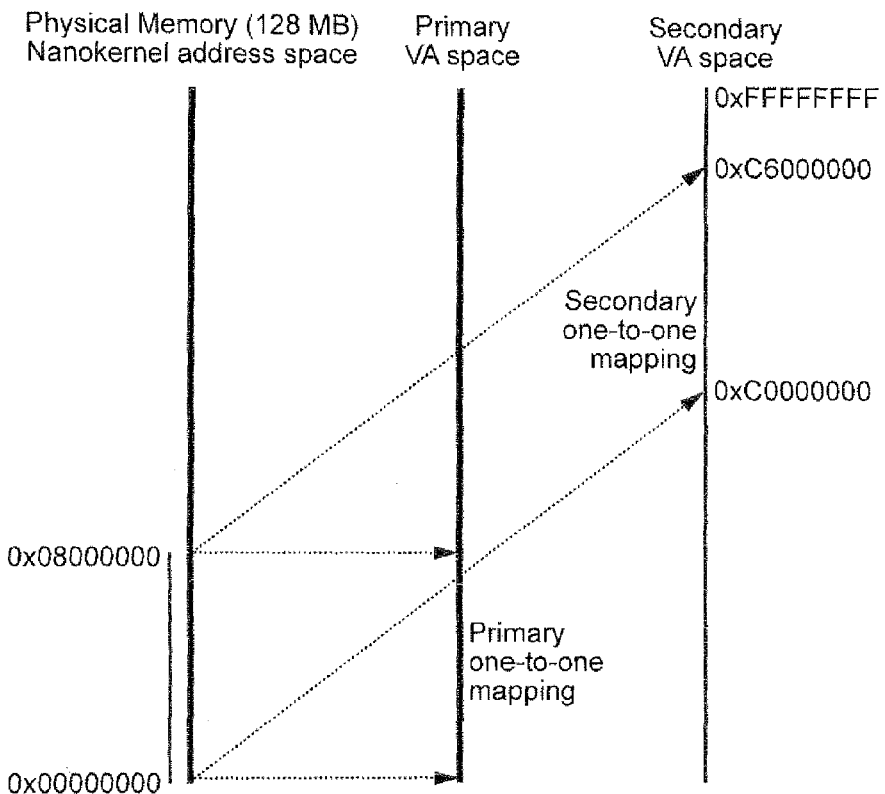
FIG. 10 shows an example of the primary, secondary and nanokernel virtual address spaces.
Figure 11:
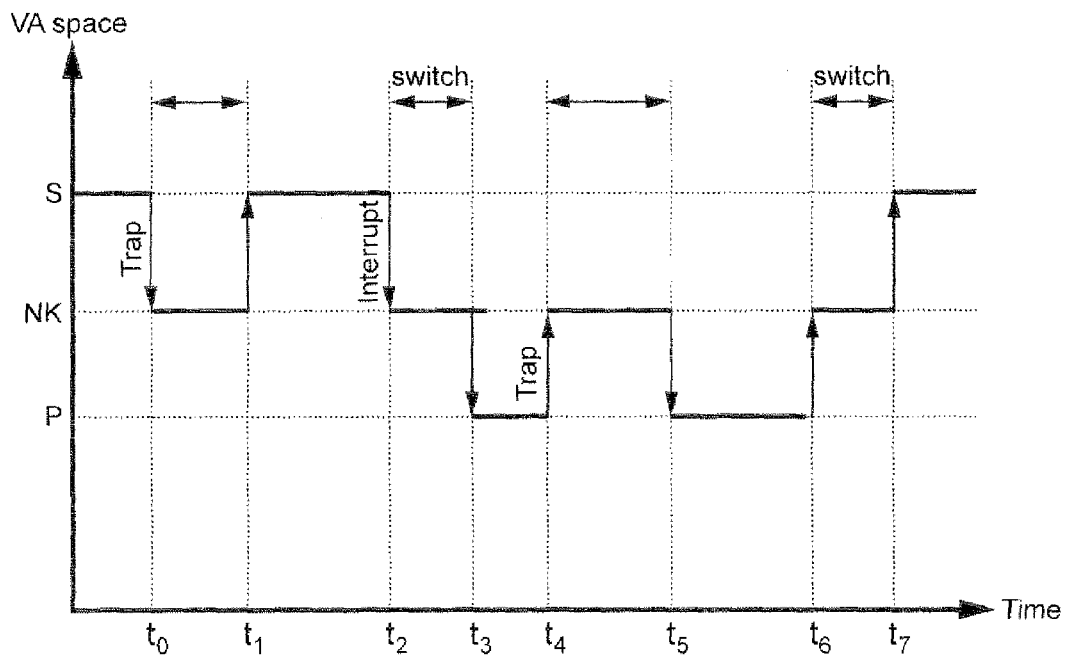
FIG. 11 shows how the memory context is switching in time.
Figure 12:
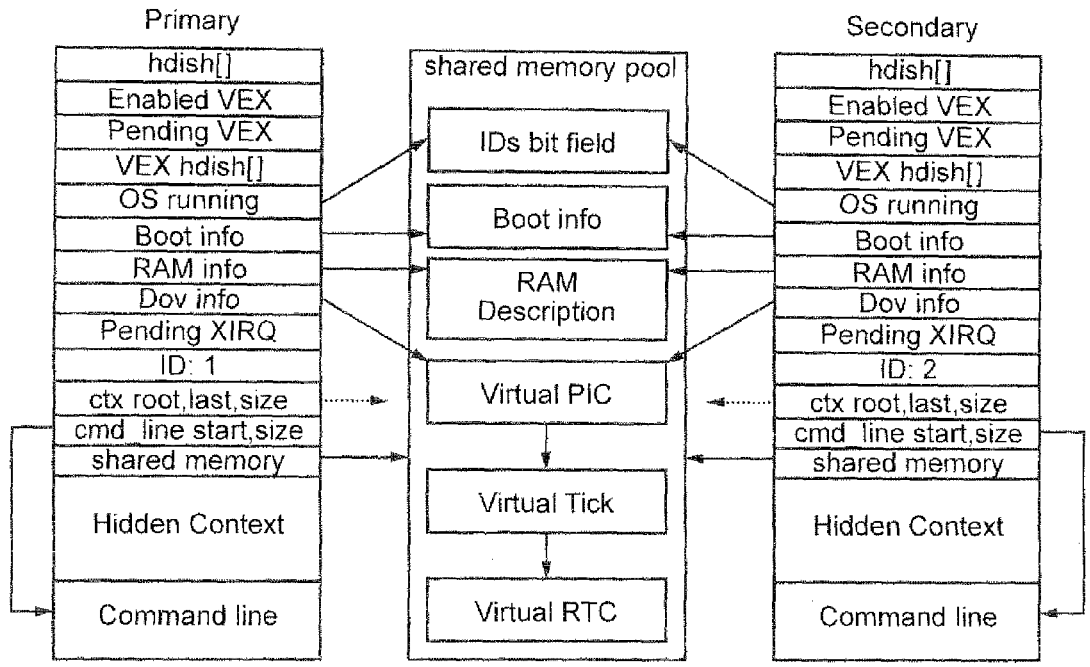
FIG. 12 illustrates the visible part of the nanokernel context.
Figure 13:
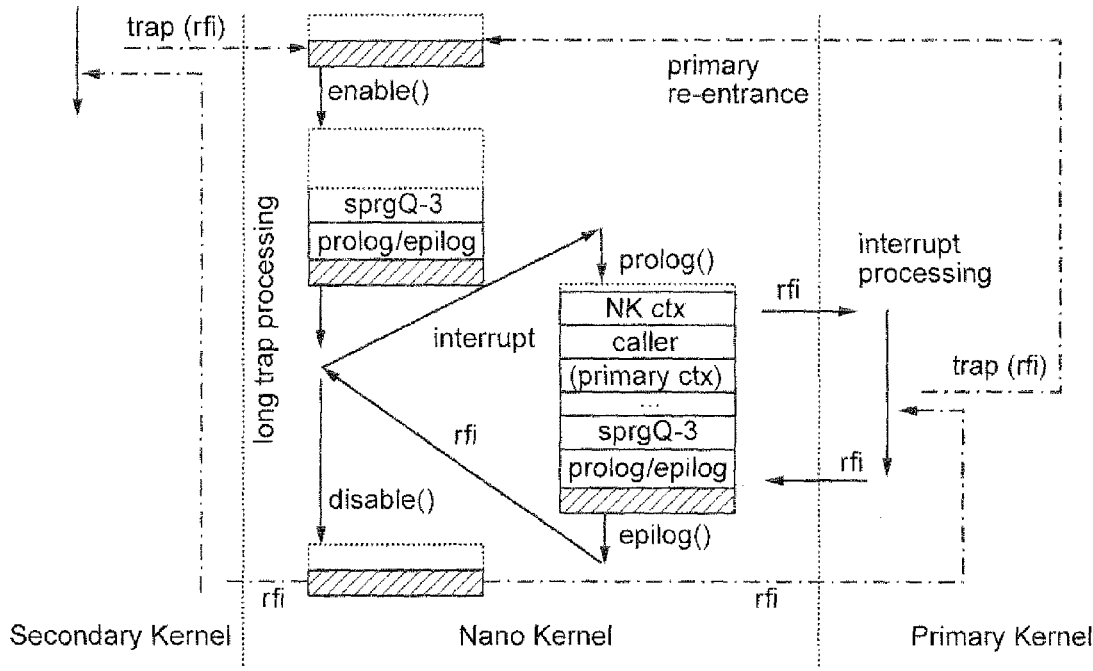
FIG. 13 shows the execution flow and how the nanokernel stack is used to allow interrupt handling and primary kernel re-entrance.

Referring to FIG. 9b, the changes necessary to migrate this arrangement to one in which the first and second operating systems run on different computers 100 are small; it is merely necessary to change the drivers used by the operating systems, so that they use drivers for a real bus 103 rather than the virtual bus drivers. The system is therefore made more independent of the hardware on which it operates.

Communication across the hardware resource dispatcher virtual bus is available to applications, but can also be used internally by the operating system kernels, so that they can cooperate in the implementation of services distributed among multiple operating systems. "Smart" distributed services of this kind include software watchdog used for system hot restart (discussed above), or a distributed network protocol stack.

Debugging

In a preferred embodiment, the hardware resource dispatcher has a second mode of operation, in which it acts as a debugging agent.

According to this embodiment, in the second mode, the hardware resource dispatcher can communicate via a serial communications line with debugging software tools running on another machine (the "host" machine).

Such debugging tools provide a high level graphical user interface (GUI) to remotely control the hardware resource dispatcher. The hardware resource dispatcher virtualised exception mechanism is used to intercept defined exceptions. The user can then configure and control how the hardware resource dispatcher behaves in case of processor exceptions, and also display machine and system states, to enable diagnosis of code or other system errors or problems.

The user can select one or more such processor exceptions as the basis for a trap call from an operating system to the hardware resource dispatcher. On the basis of the selected exception, when the or each exception occurs during execution, the operating system is stopped, and executes the trap call to the hardware resource dispatcher, which then saves the current context and enables interaction with the debugging tools on the host. The user can then cause the display of the current states of the state variables (such as the stack pointers, program and address counters) and/or the content of selected block of memory. The user can specify either that a given type of exception should be trapped in a specific operating system to be debugged, or that they should be trapped whenever they occur, in any operating system. In response, the trap call is implemented in just one, or in all, operating systems. The user can also specify if a given type of exception is to be normally forwarded to the system when restarting execution or simply ignored.

Because the hardware resource dispatcher executes in its own environment, it is able to debug much more of an operating system than could be done from within that system. Importantly, no code is shared between the hardware resource dispatcher acting as a debug agent and the systems being debugged. This allows, for example, the debugging of even kernel low level code such as exception vectors or interrupt service routines.

Some other aspects of the overall (host/target) debugging architecture according to this embodiment are similar to those for the Chorus and C5 debugging systems, described in the document "C5 1.0 Debugging Guide" published by Jaluna.

Secure Architecture

It will be clear that the embodiments described above give a firm basis for a secure architecture. This is because the secondary operating system, on which a user will typically run insecure applications, is insulated from specified system resources, and accesses them only through the hardware resource despatcher (and the drivers of the primary operating system). Thus, security applications can be run on the primary operating system which, for example, perform encryption/decryption; allow access to encrypted files; manage, store and supply passwords and other access information; manage and log access and reproduction of copyright material. Applications running on the secondary operating system cannot access system resources which are not allocated to that operating system, and where the operating systems run in different memory contexts (i.e. use different addressing pointers to different spaces) applications running on the secondary operating system cannot be used to interfere with those operating on the primary system so as to weaken the security of its operations.

This section describes the invention on PowerPC ("PPC") architecture, as an example of a Reduced Instruction Set Computer (RISC). For a background understanding of this well known architecture, the following is incorporated by reference:

"PowerPC Microprocessor Family: The Programming Environments for 32-Bit Microprocessors—Software Reference Manual" (published by IBM Inc.), Publication Number: G522-0290-01, Revision Date: Feb. 21, 2000.

In the following, the hardware resource despatcher is described (in a non-limiting sense) as a nanokernel. This section focuses on PPC specific aspects of the nanokernel implementation, in particular, on the nanokernel executive which is the corner stone of the nanokernel environment.

This section describes how the PowerPC processor architecture is used in order to implement the nanokernel executive which is capable to run multiple independent operating systems concurrently sharing the central and co-processing units (CPU and FPU) as well as the memory management unit (MMU) across these operating systems.

It also describes how the nanokernel executive handles the hardware interrupts. In particular, it describes the mechanism used to intercept and forward hardware interrupts toward the primary operating system and the software interrupts mechanism provided to the secondary operating systems.

Note that in this document we assume that the nanokernel is running on a uniprocessor computer and therefore aspects related to the symmetrical multi-processor (SMP) architecture is not addressed here.

Overview

Virtual Address Spaces

On PowerPC architecture the nanokernel always runs in the effective (physical) address space. In other words, the MMU is always disabled, and the processor is running in real mode when nanokernel code is executed.

In this description the memory context term designates a PowerPC virtual address translation context:
- a set a set of 16 virtual segment identifiers (VSID), specified in the segment registers
- a set of page table entries (PTE)
- a set of block address translations, specified in the BAT registers.

Typically, an operating system supporting user mode processes creates multiple memory contexts (one per user process) in order to be able to handle private user virtual address spaces. The kernel changes the memory context each time it switches from one user process to another. Additionally the operating system kernel also handles a unique supervisor address space. User and supervisor virtual addresses can overlap on PowerPC architecture.

The supervisor address space mappings may be either static or dynamic. The static mapping is created at system initialization time and it typically maps (entirely or partially) available physical memory. Such mapping is also called the one-to-one or kernel virtual (KV) mapping and typically use the PowerPC Block Address Translation mechanism (BAT). In particular, the KV mapping usually covers the kernel code, data and bss sections. Dynamic mappings are created at run time in order to access dynamically loaded kernel modules or dynamically allocated (non contiguous) memory chunks.

Three kinds of memory context are distinguished in the nanokernel environment: primary, secondary and nanokernel.

The primary memory context is a memory context currently used by the primary kernel. Note that, in case the primary operating system supports user address spaces, there might be multiple memory contexts used by the primary kernel but, as was already mentioned above, the supervisor address space is unique. Because the nanokernel does not care about user mappings, the primary memory context is unique from the nanokernel perspective and it consists in static and dynamic supervisor mappings established by the primary kernel.

The secondary memory context is a memory context currently used by the secondary kernel. Once more, in case the secondary operating system supports user address spaces, there might be multiple memory contexts used by the secondary kernel but there is only one supervisor address space. Thus, the secondary memory context is unique from the nanokernel perspective (for a given secondary kernel) and consists in its supervisor memory context.

The nanokernel itself do not really use a memory context as defined above but rather the PowerPC processor effective (physical) address space. However, the nanokernel address space is different from all other memory contexts and therefore can be considered as a specific one.

The nanokernel memory context is mainly used to execute the nanokernel code when a secondary kernel is preempted by an interrupt, trap or exception event handled by the nanokernel, for example, in order to perform an I/O operation to the nanokernel console. The nanokernel memory context is also used as an intermediate address space allowing to switch from a secondary execution environment to the primary one and vise versa. Note that because the PowerPC processor switches to real execution mode for exception processing, it is a natural and efficient approach to use the processor physical address space as the nanokernel memory context.

FIG. 1 shows an example of the primary and a secondary virtual address space as well as the nanokernel physical address space.

In this example the physical memory size is 128 megabytes. The primary kernel uses the trivial one-to-one (KV) mapping starting from zero (like C5 microkernel) and the secondary kernel uses a shifted one-to-one (KV) mapping starting from 0xc0000000 (like Linux kernel).

Figure 2B:
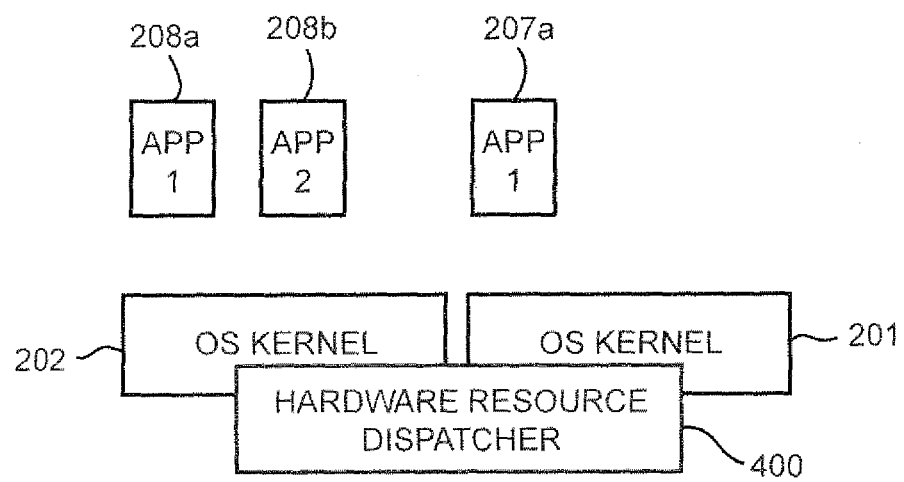
FIG. 2*b* is the corresponding diagram illustrating the arrangement of software according to the present embodiment.

FIG. 2 shows an example of how the memory context is switching in time. Initially, a secondary operating system is running in a secondary memory context. At t0 time, the current secondary kernel traps to the nanokernel in order to output a character to the nanokernel console. This trap switches the current memory context to the nanokernel one. During the [t0,t1] period, the nanokernel (running in the nanokernel memory context) prints out a character to the nanokernel console. At t1 time, the nanokernel returns to the secondary kernel switching back to the secondary memory context. At t2 time an interrupt occurs while running the secondary operating system. The interrupt switches the current memory context to the nanokernel one and invokes the nanokernel interrupt handler. In order to forward the interrupt to the primary kernel, the nanokernel switches from the nanokernel memory context to the primary one and invokes the primary interrupt handler at t3 time. During the interrupt request processing, at t4 time, the primary kernel traps to the nanokernel in order to output a character on the nanokernel console.

At t5 time, the nanokernel returns from the putchar trap call to the primary kernel which continue the interrupt request processing until the t6 time. At this moment, the primary kernel returns from the interrupt handler and the nanokernel switches back to the interrupted secondary operating system in order to continue its execution. Such a switch starts in the primary memory context and, going through the intermediate nanokernel context, finally ends up in the secondary memory context at t7 time.

Nanokernel Invocation and Preemption

The nanokernel is invoked either explicitly through a trap or implicitly through an interrupt/exception handler. In the former case, we say that an operating system kernel invokes the nanokernel. In the latter case, we say that the nanokernel preempts an operating system. It is important to underline that the nanokernel is always invoked from the privileged code running in the supervisor address space. On the other hand, the nanokernel may preempt the kernel itself as well as an user process running under kernel control. In fact, it is undesirable, and counterintuitive, to permit the nanokernel to preempt the primary kernel, and it does not do so except for floating point unit sharing (as discussed below)—the saving in switching time realised by lazy floating point sharing outweighs the drawback of occasional pre-emption.

Once the system is booted, the nanokernel is activated first and it starts execution of the primary and secondary kernels.

Once the initialization phase is done, the nanokernel plays a passive role. This means that the code executed in the nanokernel is driven by the primary and secondary kernels explicitly invoking the nanokernel (by trap) or by externally generated synchronous (i.e., exceptions) and asynchronous (i.e., interrupts) events.

On PowerPC architecture, mechanisms used for the nanokernel invocation and preemption are the same for primary and secondary operating systems. In terms of execution environment, the nanokernel is quite separate from the primary and secondary kernel as it runs in PowerPC real mode. It uses a "null" memory context (physical address space) and a different supervisor stack. There is a barrier between the operating systems (MMU enabled) and the nanokernel (MMU disabled) that provides some protections against the kernel malfunction. Note however that such a protection is not absolute because each kernel still runs privileged code in supervisor address space and therefore a secondary kernel is still able to crash the primary kernel as well as the nanokernel.

Nanokernel Invocation

The primary and secondary kernels invoke the nanokernel using a trap call mechanism. The PowerPC sc and trap instructions are not used to avoid the interception of the program and system call exceptions by the nanokernel. This would introduce performance overhead in the processing of these exceptions that are frequently used by an operating system kernel.

Instead, some exception vectors currently unused by PowerPC processor implementations, are dedicated to nanokernel trap calls (avoiding using the operating system trap calls). These exception vectors are called through a small software routine, running in the primary or secondary kernel execution environment, that puts the PowerPC processor in the same state as when a real exception occurs, and jumps to the appropriate vector using the rfi instruction. The kernels are appropriately modified. In other words, the nanokernel invocation mechanism extends the existing PowerPC exception set by simulating software exceptions triggered under control of the primary or secondary kernels.

The following exception vectors are used for nanokernel trap calls:

0x2000 idle, invoke nanokernel scheduler
0x2100 invoke nanokernel debug agent to stop execution
0x2200 invoke nanokernel console IO services
0x2300 trigger a system cross-interrupt
0x2400 restart system
0x2500 process pending virtual exception, if any (secondary only)
0x2600 halt system (secondary only)

Nanokernel invocation is made with following convention, and processor state:

translation are disabled (switch to real mode)
interrupts are disabled at processor level
caller r20 is saved in sprg0
caller r21 is saved in sprg1
caller msr is saved in r20
caller return address (next instruction to execute) is stored in r21
sub-trap number is stored in r9 (for multi-function traps)

Nanokernel Preemption

The nanokernel preempts the operating systems by intercepting the PowerPC exception/interrupt vectors. The PowerPC architecture does not provide any mechanism (like a base register) to configure the address where the exception vectors are located, but enforces them to be located at the beginning of the physical address space (at 0x00000000 in RAM) or in the first page of the last megabyte of the physical address space (at 0xfff00000 usually in ROM). Therefore, the nanokernel owns the PowerPC real exception vectors and uses an array of indirect function pointers (an exception handler table) to call the native system handler or to intercept the exception and execute a nanokernel handler instead. When an operating system is preempted by the nanokernel the processor state is automatically changed by the taken exception (real mode). Additionally, the nanokernel handler may switch to another memory context and supervisor stack, to execute a task in its own environment, or to directly switch to another operating system.

When the nanokernel just forward the exception to the native kernel handler it has to modify the register contents in order to implement an indirect call without loosing the processor state. Thus the nanokernel apply the following convention about register usage when calling a kernel exception handler (we only mention what differs from the state at exception entry):

r20 is saved into sprg0 scratch register
r21 is saved into sprg1 scratch register
1r is saved into r20 register
r21 is loaded with the exception table index (exception number*4)
1r is loaded with the address of the kernel exception handler Primary Preemption The nanokernel preempts the primary operating system only in rare cases. Typically, only the exceptions used to manage unavailable co-processing units are intercepted (FPU and AltiVec unavailable exceptions). These exceptions are used by the nanokernel to handle the unit sharing between kernels in a lazy fashion as described later in this document.

Secondary Preemption

In addition to the co-processing exceptions, a secondary operating system is also preempted when an interrupt (asynchronous exception) occurs. In such a case, the interrupt vector is intercepted by corresponding nanokernel handler (installed in secondary exception table). The nanokernel then switches to the primary memory context and call the associated primary kernel handler for this interrupt (installed in the primary exception handler table).

Kernel Context

The nanokernel data can be split on two categories: the global and per-kernel data. The global data keeps the global nanokernel state (e.g., the nanokernel memory context) while the per-kernel data keeps a state associated to a given primary or secondary kernel. The per-kernel data is also called the kernel context.

The kernel context consists in two parts: visible and hidden. The visible part is public and takes a part in the nanokernel interface. This part of the kernel context is described in detail in further sections related to the nanokernel interface. The hidden part is not visible to kernels and used internally by the nanokernel executive.

Nanokernel Executive Interface

This chapter describes the nanokernel executive interface exported to the primary and secondary kernels. Such an interface consists in a data structure shared between a kernel and the nanokernel (i.e., visible kernel context) as well as the nanokernel methods.

Visible Kernel Context

Figure 3:
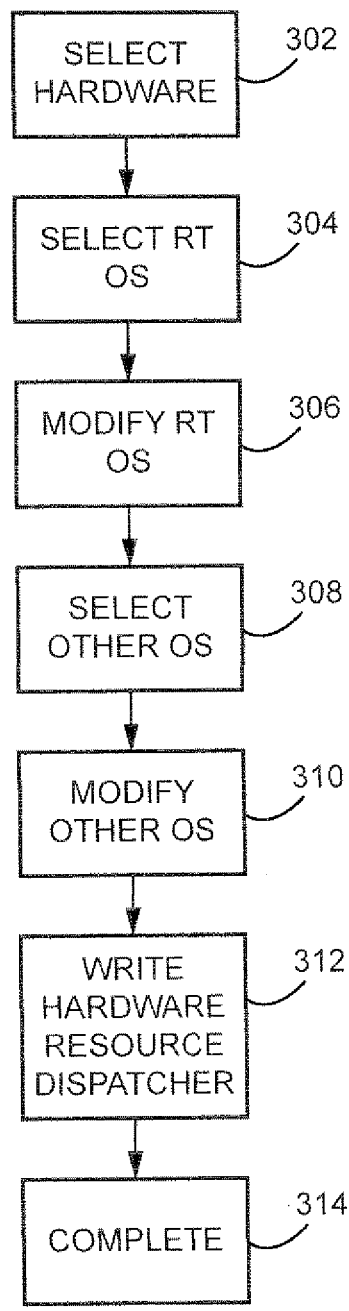
FIG. 3 is a flow diagram showing the stages in creating the software of FIG. 2*b* for the computer of FIG. 1.

FIG. 3 illustrates the visible part of the kernel context.

Note that, in the visible part of the kernel context, all references are made through physical addresses. A kernel has to convert such a physical address to the virtual one (from the KV mapping) in order to access the referenced object. The picture shows a configuration with only two kernels: primary and secondary.

The hdls[ ] field is an array of pointers to the kernel exception handlers. This array is indexed by the exception number. Each entry in this array may be set directly to the kernel native exception handler or to a nanokernel handler in order to intercept the associated exception. In the later case the kernel native exception handler pointer is located in the VEX hdls[ ] field.

The pending VEX and enabled VEX fields reflect the current state of the virtual exceptions. Note that these fields are meaningless for the primary context because the primary kernel exceptions are not virtualized by the nanokernel. The virtualized exceptions mechanism is described in detail further in this document together with the secondary kernel execution model.

The boot info field points to a global boot information structure. This field is read-only.

Such a data structure contains various processor information (frequencies) as well as a pointer to any firmware passed argument.

The cmd_line start, and size parameters points to the boot command line specifying the boot time parameters. Such parameters are given to the boot loader or passed through the nanokernel environment. The command line is kernel specific and it is located in the kernel context. The nanokernel parses the initial (multi-system) command line in order to create kernel specific command lines containing only parameters related to the corresponding kernel.

The RAM info field points to the RAM description table. This field is read-only. The RAM description table is a global data structure shared by all kernels. It describes how the RAM resource is distributed across the kernels.

The dev info field points to the list of virtual devices abstracted by the nanokernel. This field is read-only for a secondary kernel and read-write for the primary one. The devices list is global and it is shared by all kernels. Each virtual device in the list is represented by a data structure specified by the nanokernel. This data structure is typically accessed by both primary and secondary peer drivers using rules defined by the nanokernel. The primary peer driver plays a server role supporting the virtual device while the secondary peer driver plays a client role using the virtual device instead of the real one. This list is created (and modified) by the primary kernel only. A secondary kernel is only allowed to browse this list.

The pending XIRQ field specifies pending cross interrupts. This field is not used by the nanokernel itself. It is hosted by the context structure in order to assist to the primary and secondary kernels in the cross interrupts exchange. There is only one processor exception dedicated to the cross interrupt delivery. The pending XIRQ field allows to extend the number of cross interrupts up to 32 (one bit per cross interrupt source). A cross interrupt bit is set by the source kernel (i.e., the kernel which sends cross interrupt) and it is reset by the destination kernel (i.e., the kernel which receives the cross interrupt).

The ID field contains a unique kernel identifier. This field is read only. Identifier 0 is assigned to the nanokernel itself and identifier 1 is assigned to the primary kernel. The kernel identifier designates the kernel in the nanokernel interface. For example, the kernel identifier is used to tag resources assigned to a given kernel (e.g., memory chunks in the RAM description table).

The running field points to a system identifiers bit field specifying the state of corresponding kernels: running (1) or halted (0). This bit field is read only. The nanokernel sets a bit before launching the associated kernel and clears it once this kernel is halted. When a kernel is restarted, its running bit is first cleared and then set. Any kernel is able to analyze the running bit field in order to find out all running peer kernels. Note that the running bit of the primary kernel is always set.

The ctx root, and last fields point to respectively the first (nanokernel itself) and last valid kernel contexts. The ctx size field specifies the whole size of a kernel context structure including the hidden part. These fields together provide required information to manage the kernel contexts.

The shared memory field points to a pool of shared memory. It is used, mainly by the primary kernel to allocate memory to store data shared between all the kernels.

Nanokernel Methods

The nanokernel provides two groups of methods: the console I/O operations and the executive operations. The console I/O group allows a kernel to send/receive characters to/from the nanokernel console serial line. This document does not specially address the console I/O methods which are more or less generic but rather it is focused on the executive methods which are PowerPC architecture specific.

Install CPU Exception Handler

Instead of installing exception vector code directly into the PowerPC exception vectors, a kernel has to invoke this nanokernel method to attach a handler to a given processor exception. The exception number and physical address of the kernel handler code are passed as arguments. The exception number is used to index the hdls[ ] exception handler table in the kernel context, where the kernel handler pointer is stored.

The nanokernel can later use the table entry value to directly raise corresponding exception to the kernel with the minimum overhead of an additional indirect call. This method is to be used for exceptions that are directly processed by the kernels (not intercepted by the nanokernel).

Install Virtualized Exception Handler (VEX)

This method is used to attach a kernel exception handler to an exception virtualized by the nanokernel. Such an exception is either a virtual exception corresponding to a real PowerPC exception intercepted and deferred by the nanokernel, or a logical event raised by the nanokernel.

The VEX number and physical address of the kernel handler code are passed as arguments. The VEX number is used to index the vexHdls[ ] virtualized exception handler table in the kernel context, where the kernel handler pointer is stored.

Idle

The nanokernel provides an idle method which has to be called by a kernel within an idle loop. The idle method informs the nanokernel that the calling kernel has nothing to do until the next interrupt.

The idle method invocation results in a system switch to the next ready to run secondary kernel (if any) or in the return from the primary idle method when all secondary kernels are idle. The idle method has no parameter.

Restart

The nanokernel provides a restart method which can be called by the primary as well as by a secondary kernel in order to restart a secondary kernel.

The method parameter specifies identifier of the kernel being restarted. The nanokernel stops the kernel execution, restores the kernel image from its copy and finally starts the kernel execution at the initial entry point.

Note that a secondary kernel can reboot itself by calling the restart trap with its own identifier.

Secondary Halt

The halt trap is provided by the nanokernel to a secondary kernel. Such a trap is called by a secondary kernel when it is halted. The nanokernel puts the caller kernel into a non running state in order to avoid this kernel being switched in by the nanokernel scheduler.

A stopped kernel can be started again by the restart nanokernel method described above.

Primary Execution Environment

Basically, the primary kernel is executing in the native execution environment. The nanokernel implementation on PowerPC processor tries to minimize impact of the nanokernel environment to the primary operating system characteristics (performance, interrupt latency, preemption latency). Because the primary operating system is typically a real-time operating system, it is important to keep the primary kernel behavior unchanged even if other (secondary) operating systems are running concurrently on the same processor.

Initialization

The nanokernel is started first by the boot loader with disabled MMU, i.e., in the physical space. Basically, the nanokernel initialization code installs the primary memory bank (containing the primary kernel code/data/bss sections) and the other banks in the physical memory and jumps to the primary entry point.

Before jumping to the primary kernel, the nanokernel initializes the primary kernel context by calling a system specific function. This function should at least set in the hidden part of the kernel context.: the srr0 register image to the kernel entry point and the srr1 register image to the initial value expected by the system kernel.

All entries in the exception handler table (hdls[ ] field of the kernel context) point to the nanokernel debug agent entry point, except for the co-processing (FPU) unit exceptions. This ensure that any unexpected early exception will stop execution.

The nanokernel initialization code is executed using a separate static nanokernel stack located in the data section. When jumping to the primary kernel, this stack is still valid. Despite of that, the primary kernel should switch to its own stack as soon as possible and should never use this nanokernel stack in the future. The nanokernel stack is used not only at initialization phase but also at run time in order to handle secondary invocations and preemptions as described in the next chapter.

When jumping to the primary kernel, the r3 register points to the kernel context and the msr register is loaded with the srr1 image set in the kernel context. Typically, the processor interrupts are disabled at the beginning of a primary initialization phase. The primary kernel usually enables interrupts once a critical initialization phase is done.

During the initialization phase, the primary kernel typically invokes the nanokernel methods in order to attach handlers to the processor and virtualized exceptions. Finally the primary kernel enters in the idle loop and invokes the nanokernel idle method.

When the idle method is called first time, the nanokernel considers that the primary kernel has fully initialized its execution environment and it proceeds to the post initialization phase.

In such a post initialization phase, the nanokernel initializes the secondary kernel contexts as described in the next chapter. Once the post initialization is done, the nanokernel calls the scheduler in order to either switch to a ready to run secondary kernel or return from the primary idle method if all secondary kernels are idle.

The nanokernel requires the primary kernel to initialize the globally shared data structures: the RAM descriptor and the virtual devices list. Such an initialization has to be done before the idle method is called. This requirement is natural because beyond this moment a secondary kernel can access the globally shared data structures.

In particular, the primary kernel is in charge to detect the physical memory available on the board and to register free physical memory chunks in the RAM descriptor.

According to the primary Board Support Package (BSP), the primary kernel should start nanokernel aware drivers which, in turn, should populate the virtual devices list. Such virtual devices are provided to secondary kernels and therefore they should be created before the first secondary kernel is started.

Intercepted Exceptions

Basically, the nanokernel does not intercept exceptions which occur when the primary operating system is running on the processor. All programming exceptions, traps and interrupts are handled by native primary handlers. The primary low-level handlers just need to be modified in order to comply with the nanokernel exception handler calling convention for PowerPC architecture.

An exception from the above rule is programming exceptions related to the co-processing units emulation:
the floating point unavailable exception (FPU)
the vector unit unavailable exception (AltiVec VU)

These exceptions are used by the nanokernel to implement a lazy mechanism of co-processing units sharing as described further in this document.

Another special case is a debug agent which could be embedded in the nanokernel in order to provide a host based remote system debugging of the primary operating system. In this case, the debug agent usually intercepts some synchronous exceptions related either to debug features (e.g., single instruction trace) or to program errors (e.g., page fault). Such a debug agent design is however out of scope of this document.

Forwarded Interrupts

When an interrupt occurs while a secondary operating system is running on the processor, the interrupt is forwarded to the primary operating system. Such an interrupt forwarding process goes through the following major steps:
the interrupt is intercepted by the nanokernel (corresponding entry of the hdls[ ] table in secondary kernel context points to a nanokernel handler);
execution of the preempted secondary kernel is suspended and the nanokernel switches to the primary execution environment;
the nanokernel triggers the interrupt to the primary kernel (branch to corresponding entry of the hdls[ ] table in primary kernel context).

In such a way the corresponding primary low-level interrupt handler is invoked (in the primary execution environment) in order to process the interrupt. Once the interrupt is processed, the primary kernel returns to the nanokernel executing a rfi instruction.

After returning from the primary interrupt handler, the nanokernel calls the scheduler in order to determine the next secondary operating system to run. Note that the preempted secondary system would not necessary be continued after interrupt. Another (higher priority) secondary system may become ready to run because of the interrupt.

Secondary Execution Environment

Basically, the secondary kernel execution environment is quite closed to the native one except for the interrupts management. The nanokernel environment modifies the native mechanism of the interrupts management in order to make a secondary operating system fully preemptable. A secondary kernel ported to the nanokernel architecture no more disables interrupts at processor level but rather uses a software interrupts masking mechanism provided by the nanokernel (i.e., virtual exceptions). Interrupts are no more directly processed by such a secondary kernel, but rather they are intercepted by the nanokernel, forwarded to the primary kernel and only then optionally processed by the secondary kernel in a deferred way.

Initialization

The nanokernel installs the secondary memory banks at initialization time together with primary banks. On the other hand, the final initialization of a secondary kernel, in particular the kernel context setup, is deferred until the post initialization phase.

At this phase, the nanokernel allocates memory to keep a copy of secondary memory banks. Such a copy is then used to restore the initial image of secondary system at restart time. The secondary system restart is however optional and it might be disabled in order to reduce the physical memory consumption.

The secondary kernel context is setup by calling a system specific routine that initializes the context according to what is expected by the system entry point. All entries in the exception handler table (hdls[ ] field of the kernel context) point to the nanokernel debug agent entry point, except for the co-processing (FPU) unit and the interrupt entries. These ones point to nanokernel specific handlers used to intercept corresponding secondary exceptions as described in the next section.

The nanokernel launches a secondary kernel by switching to the initial execution context previously setup by the system specific routine in the kernel context hidden part.

Analogous to the primary kernel, the kernel context physical address is passed as an argument (passing convention is system specific). On the other hand, unlike the primary kernel, the interrupts are enabled at processor level (MSR[EE] is set) even during the secondary kernel initialization phase. It should be noted that even the secondary kernel initialization code is fully preemptable by the primary system. This is particularly important in order to do not disturb the primary operating system when a secondary operating system is restarted.

Despite of enabled hardware interrupts, the virtualized exceptions (corresponding to hardware interrupts) are disabled when a secondary kernel is started. So, interrupts are not delivered by the nanokernel until they are explicitly enabled by the secondary kernel at the end of the critical initialization phase. The software interrupts masking mechanism (based on virtual exceptions) is described in detail further in this document.

The stack pointer is invalid when a secondary kernel is started. Usually, the secondary kernel uses a static initial stack located in the data section in order to execute its initialization code.

Analogous to the primary kernel, during the initialization phase, a secondary kernel typically invokes the nanokernel traps in order to attach handlers to the PowerPC and virtualized exceptions. Finally the secondary kernel enters in the idle loop and invokes the nanokernel idle trap.

Intercepted Exceptions

In order to intercept a secondary exception, the nanokernel installs a pointer to its own handler into the corresponding entry of the hdls[ ] exception handler table in the secondary kernel context. Thus, when such an exception occurs, the exception vector branches to the nanokernel handler which saves the secondary memory context and process the exception.

All intercepted exceptions can be classified according to its nature as interrupts, traps and programming exceptions (faults).

The nanokernel intercepts all PowerPC interrupts (asynchronous exceptions) in order to forward them to the primary kernel:
  Reset
  Machine check
  System management
  External interrupt
  Performance monitor
  Decrementer
  Thermal Additionally, two nanokernel traps are performance critical and are handled specifically for secondary kernels.

The first one sends a cross interrupt to the primary kernel. The nanokernel processing is equivalent to the interrupt one except that the exception forwarded to the primary kernel corresponds to a software interrupt rather than to a hardware one. So, like an interrupt, this trap preempts the current secondary kernel.

The second one is called by a secondary kernel in order to process pending virtual exceptions, when they are enabled again. These traps take a part in the software interrupts masking mechanism and they are described in detail in the next section dedicated to the virtual exceptions.

Analogous to the primary kernel, the nanokernel usually does not intercept programming exceptions except some special cases described below:
  the floating point unavailable exception (FPU)
  the vector unit unavailable exception (AltiVec VU)

These exceptions are used by the nanokernel to implement a lazy mechanism of co-processing units sharing as described further in this document.

Another special case is a debug agent which could be embedded in the nanokernel in order to provide a host based remote system debugging of the secondary operating system. In this case, the debug agent usually intercepts some synchronous exceptions related either to debug features (e.g., single instruction trace) or to program errors (e.g., page fault). Such a debug agent design however is out of scope of this document.

Virtual Exceptions

Virtual exceptions (VEX) is a mechanism provided by the nanokernel which allows a kernel to post an exception to a secondary kernel and to deliver it in a deferred manner. In particular, the VEX mechanism is used in the PowerPC nanokernel architecture in order to replace hardware interrupts with software ones for a secondary kernel.

The VEX interface consists in two field located in the kernel context: pending and enabled. These fields are meaningful only for a secondary kernel context but they are accessed by both the primary and secondary kernels. All virtual exceptions are naturally enumerated by the bit position in the pending (or enabled) field. So, there are in total 32 virtual exceptions supported by the nanokernel on the PowerPC architecture (the pending and enabled fields are 32 bit integer values).

The table below shows how the virtual exceptions are mapped to the real ones:

| Virtual Exception | Real Exception | Description |
| --- | --- | --- |
| 0 | 0x2 | Machine check |
| 1 | 0x1 | Reset |

-continued

| Virtual Exception | Real Exception | Description |
|---|---|---|
| 2 | 0x14 | SMI |
| 3 | 0x5 | External interrupt |
| 4 | 0x2e | Performance monitor |
| 5 | 0x9 | Decrementer |
| 6 | 0x17 | Thermal |
| 7 | 0x23 | XIRQ |
| 8 | 0x21 | Debugger |
| 31 | — | Running |

Virtual exceptions from 0 up to 6 are mapped to the PowerPC interrupts. The virtual exception 7 is mapped to the exception vector 0x23 used to deliver cross interrupts to the secondary kernel. The virtual exceptions from 9 up to 30 are not currently used and they are reserved for future extensions. The virtual exception 31 does not correspond to any real exception and it is in fact a pseudo virtual exception which is used internally by the nanokernel is order to detect if the kernel is idle. How such a pseudo virtual exception works is described in detail further in this document.

Because multiple virtual exceptions can be pending at the same time but only one of them can be processed at a time, all virtual exceptions are prioritized according to its number. The highest priority is assigned to the Machine-check and the lowest priority is assigned to the Running pseudo exception.

The pending VEX field of a secondary context is typically updated by the primary kernel which provides a driver for the virtual PIC device. Such a driver usually posts virtual exceptions (interrupts) to secondary kernels by setting appropriate bits in the pending VEX field.

The enabled VEX field is updated by the secondary kernel in order to enable or disable virtual exceptions. A given virtual exception is enabled if the corresponding bit is set in the enabled VEX field. Using the enabled VEX field, a secondary kernel implements critical sections protected against interrupts. In other words, a secondary kernel no more uses the MSR[EE] and MSR[ME] bits to disable/enable processor interrupts but rather modifies the enabled VEX field of its kernel context.

A given virtual exception is delivered by the nanokernel if it is pending and enabled simultaneously. The nanokernel resets the corresponding pending bit just before jumping to the secondary exception handler.

Note that, when porting a secondary kernel on the PowerPC nanokernel architecture, low-level exception handlers have to be modified in order to take into account the software interrupts masking mechanism which substitutes the hardware one. The hardware interrupts are always enabled at processor level when running a secondary kernel, except in low-level exception handler code, where processor state is saved using shared resources (scratch registers) requiring a critical section. In such a way, in the nanokernel environment, a secondary operating system becomes highly preemptable by the primary operating system; it is pre-emptable except for the short periods when such low-level exception code is saving state.

A virtual exception can be posted by the primary kernel while it is in disabled state. It this case, the exception is not delivered to the secondary kernel but it is rather kept pending until the exception is re-enabled again. So, when virtual exceptions are re-enabled by a secondary kernel, a check should be made whether any virtual exceptions are pending. If the check is positive, the secondary kernel should invoke the nanokernel in order to process such pending virtual exceptions. Such check is made by mean of the "process pending virtual exception" trap (nanokernel specific vector 0x2500).

In general, a secondary kernel re-enables virtual exceptions in two following cases:
 when virtual exceptions has been previously disabled by the secondary kernel in order to protect a critical section of code;
 when virtual exceptions has been disabled while processing a processor exception low-level handler.

Nanokernel Re-Entrance

The nanokernel code is mostly executed with interrupts disabled at processor level preventing re-entrance into the nanokernel. On the other hand, some nanokernel invocations may take a long time and therefore the nanokernel has to enable interrupts when executing such long operations in order to keep the primary interrupt latency low.

There are two kinds of long nanokernel operations:
 synchronous console output
 The operation duration depends on the serial line speed. For example, on a 9600 baud rate line, a single character output may take up to 1 millisecond.
 secondary kernel restart
 The operation duration depends on the kernel image size which is restored from a copy.

For all operations listed above, the nanokernel enables interrupts and therefore re-entrance from the primary kernel. On the other hand, while interrupts are enabled, the nanokernel scheduler is never called in order to prevent another secondary kernel to be scheduled when returning from the primary interrupt handler. In other words, the nanokernel can be preempted by the primary kernel only (as result of an interrupt) but re-entrance from a secondary kernel is prohibited. Such a restriction allows the nanokernel to use global resources for the secondary execution environment. Thus, when the nanokernel is entered from a secondary operating system, it is not necessary to save all states, since it cannot be interrupted from a secondary operating system.

The discussion above shows that the nanokernel must be capable to enable processor interrupts while executing code in the nanokernel memory context resulting from a trap called by the primary or a secondary kernel. In other words, the nanokernel must support a switch to the primary interrupt handler while running its own trap call handler.

In order to support such a context switch nesting, the nanokernel manages a kernel context for itself. The nanokernel kernel context has a zero identifier value (ID field). It is used to save the nanokernel execution context (in hidden part) when switching to the primary kernel on interrupt. It is also used to store nanokernel specific interrupt handler pointers (in hdls[ ] table). In this way, interrupts can be vectored through the "currently" executing kernel context even when the nanokernel code is running. Additionally, the nanokernel supervisor stack is used to push critical shared processor resources as well as a part of the nanokernel and primary kernel contexts that would otherwise be overwritten on primary kernel re-entrance.

The nanokernel uses an interrupt prolog/epilog pair of routines to handle an interrupt in the nanokernel and to return to nanokernel interrupted code at the end of the interrupt processing by the primary kernel. Note that the prolog/epilog pair of routines is different depending on the last kernel that has been calling a nanokernel trap. Indeed the kind and amount of information to be pushed on the stack is not the same for the primary or a secondary trap caller.

The interrupt prolog routine is the nanokernel interrupt handler. It is attached to all interrupt entries of the hdls[ ]

exception handler table in the nanokernel kernel context. This handler performs the following actions:

save part of the kernel contexts into an interrupt frame on the stack,
   update kernel contexts with current values to handle primary kernel re-entrance,
   modify srr0 register value to return to the appropriate epilog routine,
   switch to the corresponding primary kernel interrupt handler.

The interrupt epilog routine is called when returning from the primary kernel interrupt processing (rfi). It is used to directly restore the nanokernel interrupted execution context without calling the nanokernel scheduler, and goes through the following steps:

restore current state from kernel contexts,
   restore kernel contexts from the interrupt stack frame (saved by the prolog routine),
   return to the interrupted code.

The nanokernel interrupt stack frame is used to save the following information:

copy of critical part of the nanokernel kernel context: 1r, r1, r2, srr0, srr1 registers,
   the last trap caller (pointer to a primary or secondary kernel context).
   only if last trap caller is the primary: copy of critical part of the primary kernel context: r1, r2, srr0, srr1 registers.

The nanokernel defines a pair of functions which are used to enable/disable interrupts. These functions respectively save and restore in the stack an additional part of the nanokernel execution context which is not systematically saved at trap entry.

When enabling interrupt, the nanokernel goes through the following steps:

save scratch registers in the stack (sprg0-3),
   save current pair of interrupt prolog/epilog routines in the stack,
   update current pair of interrupt prolog/epilog routines according to trap caller (primary or secondary),
   enable interrupts at processor level (set MSR[EE] bit).

When disabling interrupt, the nanokernel goes through the following steps:

disable interrupts at processor level (clear MSR[EE] bit),
   restore current pair of interrupt prolog/epilog routines from the stack,
   restore scratch registers from the stack (sprg0-3).

The FIG. 4 shows the execution flow and how the nanokernel stack is used to allow interrupt handling and primary kernel re-entrance.

Scheduler

The main role of an operating system scheduler is to choose the next task to run. Because the nanokernel controls execution of operating systems, the nanokernel scheduler chooses the next secondary operating system to run. In other words, the nanokernel adds an extra scheduling level to the whole system.

Note that, in the nanokernel architecture, the primary operating system has a higher priority level with respect to secondary systems and the CPU is given to a secondary system only when the primary one is in the idle loop. We can say that the primary kernel is not preemptable and it explicitly invokes the nanokernel scheduler through the idle method called in the idle loop. Once an interrupt occurs when running a secondary system, the primary kernel interrupt handler is invoked. From the primary kernel perspective, such an interrupt preempts the background thread executing the idle loop. Once the interrupt is handled and all related tasks are done, the primary kernel returns to the nanokernel which invokes the nanokernel scheduler in order to determine the next secondary system to run. From the primary perspective, the kernel just returns to the background thread preempted by the interrupt. The secondary activity is transparent for the primary kernel and it does not change the primary system behavior.

The nanokernel may implement different scheduling policies. By default, however, a priority based algorithm is used. Note that, at the same priority level, the nanokernel uses a round-robin scheduling policy. Priority of a given secondary kernel is statically configured at system image build time.

Whatever the implemented scheduling policy is, the scheduler has to detect whether a given secondary system is ready to run. This condition is calculated as the bitwise logical and operation between the pending VEX and enabled VEX fields of the kernel context. A non zero result indicates that the system is ready to run.

As was described above, each bit in the pending VEX and enabled VEX pair represents a virtual exception. Rephrasing the ready to run criteria, we can say that a secondary system is in the ready to run state if there is at least one non masked pending virtual exception.

Among all virtual exceptions which are typically mapped to the hardware and software (cross) interrupts, there is a special virtual exception (running) reflecting whether the kernel is currently idle.

The running bit is cleared in the pending VEX field each time a secondary kernel invokes the idle method and the running bit is set in the pending VEX field each time a virtual exception is delivered to the secondary kernel.

The running bit is normally always set in the enabled VEX field for a running secondary kernel. The nanokernel sets this bit when a secondary kernel is started and it resets this bit when a secondary kernel is halted. The secondary kernel should never clear the running bit when masking/unmasking interrupts mapped to virtual exceptions.

Note that an external agent is able to suspend/resume execution of a secondary kernel by clearing/restoring the enabled VEX field in its kernel context. This feature opens possibilities for a scheduling policy agent to be implemented outside of the nanokernel, as a primary kernel task. In addition, this also enables a debug agent for a secondary kernel to be running as a task on top of the primary kernel. An advantage of such a secondary debug agent is that all services provided by the primary operating system become available for debugging (e.g., networking stack) and the secondary kernel debugging may be done concurrently with critical tasks running on the primary operating system.

Cross Interrupts

This section mostly consolidates information (already given in previous sections) related to the nanokernel cross interrupts mechanism.

Two following kinds of cross interrupts will be considered here:

a cross interrupt sent to a secondary kernel
   a cross interrupt sent to the primary kernel In order to send a cross interrupt to a destination secondary kernel, a source kernel first sets a bit corresponding to the cross interrupt source in the pending XIRQ field of the destination kernel context. Then the source kernel posts the cross interrupt VEX to the destination kernel setting the corresponding bit in the pending VEX field of the destination kernel context. Once the cross interrupt handler is called by the nanokernel, it checks the pending XIRQ field, clears bit corresponding to the pending cross interrupt source and finally invokes handlers attached to this source. Both source and destination kernels uses atomic instructions to update the pending XIRQ field. Note that the same algorithm is used by both types of source kernel: primary and secondary.

In order to send a cross interrupt to the primary kernel, a secondary kernel first sets a bit corresponding to the cross interrupt source in the pending XIRQ field of the primary kernel context. Then the secondary kernel invokes the nanokernel executing the XIRQ trap. The nanokernel immediately preempts the secondary kernel and invokes the primary low-level cross interrupt handler which checks the pending XIRQ field, clears bit corresponding to the pending cross interrupt source and finally invokes handlers attached to this source.

The cross interrupt zero must not be used by kernels. This interrupt is reserved for the nanokernel to notify kernels that a halted kernel has been started or a running kernel has been halted. In other words, the cross interrupt zero notifies running kernels that the global system configuration is changed. It is broad casted to all running kernels each time the state of the running bit field pointed to by the kernel contexts, is changed.

Co-Processing Units Management

The co-processing units (FPU, SIMD unit) are computing resources which are typically shared by all operating systems running in the nanokernel environment. In the following the floating-point unit (FPU) is taken as an example. However other co-processing units like AltiVec vectorial computing unit (SIMD) are managed in same way.

On PowerPC architecture, the nanokernel manages co-processing units sharing in a lazy manner. This means, for example, that when a switch from one operating system to another occurs, the FPU is not immediately given to the newly scheduled operating system, instead, the FPU context switch is deferred until the newly scheduled system really executes floating-point instructions and accesses floating-point registers.

Such a lazy FPU dispatching algorithm allows the nanokernel to reduce the system switch time. This is especially important in order to reduce the primary interrupt latency because FPU is normally not used at interrupt level and therefore it is usually not necessary to save and restore FPU registers in order to preempt a secondary operating system and to call a primary interrupt handler.

The nanokernel handles an FPU owner global variable pointing to the context of the kernel which currently uses FPU. In case there is no FPU owner, the FPU owner context is set to zero. An FPU context is located in the hidden part of the kernel context. Such a context keeps state of the FPU engine (i.e., floating-point registers and status) when the kernel is not FPU owner. Obviously, the state of the FPU owner is kept by the FPU engine hardware. When the nanokernel changes the FPU owner, the FPU state is saved to the old FPU context and restored from the new one.

The nanokernel uses the floating-point unavailable (FP) bit of the MSR register in order to provoke an exception when FPU is used by a non FPU owner. The MSR register image takes a part in the hidden part of the kernel context. The MSR[FP] bit is cleared in the previous owner context, and set in the newly owner context, at FPU switch time. The FP bit is cleared in all kernel contexts except the FPU owner where it is set. This allows for the nanokernel to intercept the floating-point unavailable exception (0x8) for all non FPU owners while the FPU owner handles this exception in a native way.

An FPU switch occurs when the nanokernel intercepts the "FP unavailable" exception (this requires a modification to the operating system kernel). In order to switch the FPU engine between two kernels, the nanokernel releases the current FPU owner and assigns the new one.

In order to release the current FPU owner, the nanokernel saves the current FPU state in its kernel context together with the current state of the MSR[FP] bit and clear the FP bit in the MSR register image. In addition, the nanokernel installs its own exception handler into the appropriate entry of the hdls[ ] exception handler table in the kernel context, in order to intercept the FP unavailable exception (0x8). The native exception handler pointer is saved in a savedHdls[ ] table into the hidden part of the kernel context.

In order to assign a new FPU owner, the nanokernel restores the FPU state from the kernel context and the previously saved state of the FP bit into the MSR image. In addition, the native exception handler is restored from the savedHdls[ ] table into the hdls[ ] table of the kernel context, in order to handle the FP unavailable exception in a native way while owning FPU.

Because the nanokernel uses the FP bit of the MSR register in order to implement a lazy FPU switch, a kernel is not allowed to change the state of this bit while it is not owner of the FPU (outside of the native FP unavailable exception handler). In particular, this means that the FPU emulation is not supported by a kernel ported to the nanokernel architecture.

Note that usually an operating system kernel also uses the FP bit of the MSR register in order to implement a lazy FPU switch between processes. Because the MSR register image takes a part in the kernel context and therefore it is saved and restored at system switch, the native FPU management can be kept almost unchanged in the nanokernel environment.

The same mechanisms are used for the vectorial computing units integrated into some PowerPC processor implementations (AltiVec). In that case the VU bit of the MSR register plays the same role as the FP bit does for the FPU. Also, the vector unavailable exception (vector 0x0f20) is intercepted to implement context switch of the SIMD unit in a lazy manner.

Other Aspects and Embodiments

It will be clear from the forgoing that the above-described embodiments are only examples, and that many other embodiments are possible. The operating systems, platforms and programming techniques mentioned may all be freely varied. Any other modifications, substitutions and variants which would be apparent to the skilled person are to be considered within the scope of the invention, whether or not covered by the claims which follow. For the avoidance of doubt, protection is sought for any and all novel subject matter and combinations thereof disclosed herein.

The invention claimed is:

1. A method of enabling multiple different operating systems to run concurrently on the same computer, said method comprising:
  selecting a first operating system to have a high priority;
  selecting at least one second operating system to have a lower priority;
  providing a common program arranged to switch between said first and second operating systems under predetermined conditions; and
  providing modifications to said first and second operating systems to allow them to be controlled by said common program;
  allocating exception vectors to a trap call mechanism running on said first and second operating systems to trap calls for the common program from said first and second operating systems and enabling invocation of the common program using the trap call mechanism;
  wherein switching between said first and second operating systems occurs by responding to real or virtual events of said first and second operating systems and includes invoking the common program by calling an exception vector from the exception vectors allocated to the trap call mechanism, and wherein calling the exception vector to invoke the common program simulates the real or the virtual events of said operating systems as an exception caused by an external event.

2. The method of claim 1, wherein the common program preempts the first or second operating system by intercepting exception or interrupt vectors.

3. The method of claim 2, further comprising using a exception handler table containing an array of pointers to intercept exceptions, and activating an exception handler program to preempt the first or second operating system.

4. The method of claim 1, wherein the common program is executed in real mode in physical processor address space.

5. The method of claim 4, comprising preempting the first or second operating system by the common program, and switching to real mode in physical processor address space when preempting the first or second operating system.

6. The method of claim 4, comprising invoking the common program by the first or second operating system, and switching to real mode in physical processor address space when invoking the common program.

7. The method of claim 1, comprising enabling hardware interrupts throughout the operation of the second operating system except during the operation of subroutines that save machine state.

8. The method of claim 1, in which the first operating system is a real time operating system.

9. The method of claim 1, in which the second operating system is a non-real time, general-purpose operating system.

10. The method of claim 1, in which the second operating system is Linux, or a version or variant thereof.

11. The method of claim 1, in which the common program is arranged to save, and to restore from a saved version, the processor state required to switch between the first and second operating systems.

12. The method of claim 1, in which processor exceptions for the second operating system are handled in virtual fashion by the common program.

13. The method of claim 1, in which the common program is arranged to intercept some processor exceptions, and to call exception handling routines of the first operating system to service them.

14. The method of claim 13, in which the processor exceptions for the second operating system are notified as virtual exceptions.

15. The method of claim 14, in which the common program is arranged to call an exception handling routine of the second operating system corresponding to a said virtual exception which is pending.

16. The method of claim 1, further comprising providing each of said first and second operating systems with separate memory spaces in which each can exclusively operate.

17. The method of claim 1, further comprising providing each of said first and second operating systems with first input and/or output devices of said computer to which each has exclusive access.

18. The method of claim 17, in which each operating system accesses said first input and/or output devices using substantially modified native routines.

19. The method of claim 1, further comprising providing each of said first and second operating systems with access to second input and/or output devices of said computer to which each has shared access.

20. The method of claim 19, in which all operating systems access said second input and/or output devices using the routines of the first operating system.

21. The method of claim 20, in which the common program provides trap call mechanisms, to control the operation of the second operating system, and/or event mechanisms to notify the first operating system of status changes in the second operating system.

22. The method of claim 1, further comprising combining said first and second operating systems and common program into a single code product stored in a memory.

23. A computer program product stored in a memory and comprising code that when executed by a processor comprises code combined according to claim 22.

24. The method of claim 1, further comprising embedding said first and second operating systems and common program stored onto persistent memory on a computer product.

25. A development kit computer program product stored in a memory and comprising code that when executed by a processor performs the steps of claim 1.

26. The method of claim 1 in which the computer has a Reduced Instruction Set architecture.

27. The method of claim 1, wherein said events are exceptions or interrupts.

28. A computer system comprising:
a CPU, memory devices and input/output devices, said CPU being arranged to execute computer code comprising:
a first operating system having a relatively high priority;
a second operating system having a relatively lower priority; and
a common program arranged to run said first and second operating systems concurrently by switching between said first and second operating systems under predetermined conditions, and
a trap call mechanism, having exception vectors allocated to the trap call mechanism, running on said first and second operating system to trap calls for the common program from said first and second operating systems and enabling invocation of the common program using the trap call mechanism;
wherein switching between said first and second operating systems occurs by responding to real or virtual events of said first and second operating systems and includes the first or second operating system invoking the common program by calling an exception vector from the exception vectors allocated to the trap call mechanism, and
wherein calling the exception vector to invoke the common program simulates the read or virtual events of said operating systems as an exception caused by an external event.

29. A computer system according to claim 28,
arranged to run said first and second operating systems concurrently by: selecting a first operating system to have a high priority;
selecting at least one second operating system to have a lower priority;
providing a common program arranged to switch between said first and second operating systems under predetermined conditions; and
providing modifications to said first and second operating systems to allow them to be controlled by said common program;
wherein switching between said first and second operating systems occurs by responding to real or virtual events and includes invoking the common program by calling an exception vector, and wherein calling an exception vector to invoke the common program simulates an exception caused by an external event.

30. The computer system of claim 29, wherein said events are exceptions or interrupts.

31. The computer system of claim 28, wherein said events are exceptions or interrupts.

* * * * *